(12) United States Patent
Qiu et al.

(10) Patent No.: US 10,449,739 B2
(45) Date of Patent: Oct. 22, 2019

(54) HYDROGEL CONTACT LENSES WITH LUBRICIOUS COATING THEREON

(71) Applicant: Novartis AG, Basel (CH)

(72) Inventors: Yongxing Qiu, Suwanee, GA (US); John Dallas Pruitt, Suwanee, GA (US); Jared Nelson, Buford, GA (US)

(73) Assignee: Novartis AG, Basel (CH)

( * ) Notice: Subject to any disclaimer, the term of this patent is extended or adjusted under 35 U.S.C. 154(b) by 71 days.

(21) Appl. No.: 15/704,205

(22) Filed: Sep. 14, 2017

(65) Prior Publication Data

US 2018/0079158 A1    Mar. 22, 2018

Related U.S. Application Data

(60) Provisional application No. 62/396,845, filed on Sep. 20, 2016.

(51) Int. Cl.
| | | |
|---|---|---|
| *B29D 11/00* | (2006.01) | |
| *C08F 20/00* | (2006.01) | |
| *G02B 1/04* | (2006.01) | |
| *C08F 220/20* | (2006.01) | |
| *C08F 220/58* | (2006.01) | |

(52) U.S. Cl.
CPC .. *B29D 11/00067* (2013.01); *B29D 11/00038* (2013.01); *B29D 11/00865* (2013.01); *B29D 11/00923* (2013.01); *C08F 20/00* (2013.01); *G02B 1/043* (2013.01); *B29K 2995/0092* (2013.01); *C08F 220/20* (2013.01); *C08F 220/58* (2013.01)

(58) Field of Classification Search
None
See application file for complete search history.

(56) References Cited

U.S. PATENT DOCUMENTS

| | | | |
|---|---|---|---|
| 5,461,433 A | 10/1995 | Nakabayashi et al. | |
| 5,508,317 A | 4/1996 | Mueller | |
| 5,583,163 A | 12/1996 | Mueller | |
| 5,789,464 A | 8/1998 | Mueller | |
| 5,849,810 A | 12/1998 | Mueller | |
| 6,143,210 A | 11/2000 | Wrue et al. | |
| 6,218,508 B1 | 4/2001 | Kragh et al. | |
| 6,303,687 B1 | 10/2001 | Mueller | |
| 6,627,124 B1 | 9/2003 | Herbrechtsmeier et al. | |
| 6,800,225 B1 | 10/2004 | Hagmann et al. | |
| 7,384,590 B2 | 6/2008 | Kelly et al. | |
| 7,387,759 B2 | 6/2008 | Kelly et al. | |
| 8,088,313 B2 | 1/2012 | Hagmann et al. | |
| 8,481,662 B2 | 7/2013 | Liu et al. | |
| 8,529,057 B2 | 9/2013 | Qiu et al. | |
| 8,658,748 B2 | 2/2014 | Liu et al. | |
| 8,820,928 B2 | 9/2014 | Back et al. | |
| 9,102,110 B2 | 8/2015 | Bruce et al. | |
| 9,422,447 B2 | 8/2016 | Holland et al. | |
| 2004/0116564 A1 | 6/2004 | Devlin et al. | |
| 2004/0181172 A1* | 9/2004 | Carney | A61B 5/145 600/573 |
| 2007/0035049 A1 | 2/2007 | Bruce et al. | |
| 2008/0048350 A1 | 2/2008 | Chen et al. | |
| 2010/0201009 A1 | 8/2010 | Bruce et al. | |
| 2012/0026457 A1 | 2/2012 | Qiu et al. | |
| 2012/0026458 A1 | 2/2012 | Qiu et al. | |
| 2012/0218509 A1 | 8/2012 | Back et al. | |
| 2012/0220690 A1 | 8/2012 | Liu et al. | |
| 2012/0314185 A1 | 12/2012 | Bauman et al. | |
| 2013/0118127 A1 | 5/2013 | Kolluru et al. | |
| 2013/0261216 A1 | 10/2013 | Liu et al. | |
| 2013/0337160 A1* | 12/2013 | Holland | C09D 139/04 427/162 |
| 2016/0061995 A1 | 3/2016 | Chang et al. | |
| 2016/0326046 A1 | 11/2016 | Quinter et al. | |
| 2016/0326395 A1 | 11/2016 | Holland et al. | |
| 2017/0068018 A1 | 3/2017 | Qian et al. | |
| 2017/0068019 A1 | 3/2017 | Qian et al. | |
| 2017/0165932 A1 | 6/2017 | Qian et al. | |

(Continued)

FOREIGN PATENT DOCUMENTS

| | | | |
|---|---|---|---|
| EP | 0963761 A1 * | 12/1999 | A61L 27/34 |
| EP | 0963761 A1 | 12/1999 | |

(Continued)

*Primary Examiner* — Peter A Salamon
(74) *Attorney, Agent, or Firm* — Jian Zhou

(57) ABSTRACT

The invention is generally related to soft contact lenses which comprise a non-silicone hydrogel lens body and a hydrogel coating thereon. The non-silicone hydrogel lens body is composed of a hydrogel material which is free of silicone and comprises at least 50% by mole of repeating units of at least one hydroxyl-containing vinylic monomer. The hydrogel coating comprises a first polymeric material having first reactive functional groups and a hydrogel layer derived from a second polymeric material having second reactive functional groups, and the hydrogel layer is covalently attached onto the anchor layer through linkages each formed between one first reactive functional group and one second reactive functional group. The soft contact lens has a surface lubricity better than the lubricity of the non-silicone hydrogel lens body and has a friction rating of about 2 or lower after 7 cycles of manual rubbing, a water content of from about 10% to about 85% by weight and an elastic modulus of from about 0.2 MPa to about 1.5 MPa when being fully hydrated at room temperature.

20 Claims, No Drawings

(56) References Cited

U.S. PATENT DOCUMENTS

| | | |
|---|---|---|
| 2018/0079157 A1 | 3/2018 | Tucker et al. |
| 2018/0079889 A1 | 3/2018 | Chiang et al. |
| 2018/0081197 A1 | 3/2018 | Qiu et al. |
| 2018/0113236 A1 | 4/2018 | Bothe et al. |
| 2018/0120590 A1 | 5/2018 | Bothe |

FOREIGN PATENT DOCUMENTS

| | | |
|---|---|---|
| EP | 1465931 B1 | 8/2007 |
| EP | 1617757 B1 | 8/2009 |
| WO | 00/12296 A1 | 3/2000 |
| WO | 2007/021596 A1 | 2/2007 |
| WO | 2012/118672 A2 | 9/2012 |
| WO | 2012/118681 A2 | 9/2012 |
| WO | 2013/188274 A2 | 12/2013 |
| WO | 2016145204 A1 | 9/2016 |

* cited by examiner

HYDROGEL CONTACT LENSES WITH LUBRICIOUS COATING THEREON

This application claims the benefit under 35 USC § 119 (e) of U.S. provisional application No. 62/396,845 filed 20 Sep. 2016, herein incorporated by reference in its entirety.

This invention is related to non-silicone hydrogel contact lenses, especially polyvinylalcohol-based hydrogel contact lenses, which have a soft, lubricious hydrogel coating thereon. In addition, the invention provides a method for making such contact lenses.

BACKGROUND

Most commercially-available non-silicone hydrogel contact lenses are produced from one or more hydroxyl-containing vinylic monomers (e.g., hydroxyethyl methacrylate, glycerol methacrylate, etc.) as the major lens-forming components according to a conventional cast molding technique involving use of disposable plastic molds and a mixture of vinylic monomers and crosslinking agents. There are several disadvantages with the conventional cast-molding technique. For example, a traditional cast-molding manufacturing process often includes lens extraction in which unpolymerized monomers must be removed from the lenses by using an organic solvent. Use of organic solvents can be costly and is not environmentally friendly. In addition, disposable plastic molds inherently have unavoidable dimensional variations, because, during injection-molding of plastic molds, fluctuations in the dimensions of molds can occur as a result of fluctuations in the production process (temperatures, pressures, material properties), and also because the resultant molds may undergo non-uniformly shrinking after the injection molding. These dimensional changes in the mold may lead to fluctuations in the parameters of contact lenses to be produced (peak refractive index, diameter, basic curve, central thickness etc.) and to a low fidelity in duplicating complex lens design.

The above described disadvantages encountered in a conventional cast-molding technique can be overcome by using the so-called Lightstream Technology™ (Alcon), which involves (1) a lens-forming composition being substantially free of monomers and comprising a substantially-purified, water-soluble polyvinylalcohol prepolymer with ethylenically-unsaturated groups, (2) reusable molds produced in high precision, and (3) curing under a spatial limitation of actinic radiation (e.g., UV), as described in U.S. Pat. Nos. 5,508,317, 5,583,163, 5,789,464, 5,849,810, 6,800,225, and 8,088,313. Non-silicone hydrogel Lenses produced according to the Lightstream Technology™, for example, DAILIES® AquaComfort Plus®, can have high consistency and high fidelity to the original lens design, because of use of reusable, high precision molds. In addition, contact lenses with high optical quality can be produced at relatively lower cost due to the short curing time, a high production yield, and free of lens extraction and in an environmentally friendly manner because of use of water as solvent for preparing lens formulations. However, although DAILIES® AquaComfort Plus® lenses have a good optical quality, a high water content (about 69% by weight), and a good surface wettability, they may not have a desired surface lubricity for ensuring a superior wearing comfort.

Therefore, there are still needs for a new non-silicone hydrogel contact lens having a superior surface lubricity and for a method capable of producing such contact lenses.

SUMMARY

In one aspect, the invention provides a method for producing soft contact lenses, comprising the steps of: (1) obtaining a preformed non-silicone hydrogel contact lens, wherein the preformed hydrogel contact lens is composed of a polymer comprising at least 50% by mole of repeating units of at least one hydroxyl-containing vinylic monomer; (2) contacting the preformed non-silicone hydrogel contact lens with a first aqueous coating solution of a polyanionic polymer at a pH of about 4.0 or less and at a coating temperature of from about 25° C. to about 80° C. to obtain a soft contact lens precursor which is the preformed non-silicone hydrogel contact lens having a layer of the polyanionic polymer thereon, wherein the polyanionic polymer is a homo- or copolymers of acrylic acid, methacrylic acid, ethylacrylic acid, or 2-(meth)acrylamidoglycolic acid; and (3) heating the soft contact lens precursor obtained in step (2), in a second aqueous coating solution which comprises a water-soluble and thermally-crosslinkable hydrophilic polymeric material having azetidinium groups, at a temperature of from about 60° C. to about 140° C. for at least 30 minutes to crosslink the water-soluble thermally-crosslinkable hydrophilic polymeric material and the polyanionic polymer so as to form the soft contact lens with a hydrogel coating thereon, wherein the hydrogel coating is covalently attached onto the layer of the polyanionic polymer, wherein the soft contact lens in fully hydrated state has a friction rating of about 2 or lower after 7 cycles of manual rubbing, provided that the elastic modulus of the soft contact lens is equal to the elastic modulus of the preformed non-silicone hydrogel contact lens within a margin of about ±10% or less.

In another aspect, the invention provides a soft contact lens which comprises: a non-silicone hydrogel lens body; and a hydrogel coating thereon, wherein the non-silicone hydrogel lens body is composed of a hydrogel material which is free of silicone and comprises at least 50% by mole of repeating units of at least one hydroxyl-containing vinylic monomer, wherein the coating comprises an anchoring layer of a first polymeric material having first reactive functional groups and a hydrogel layer derived from a second polymeric material having second reactive functional groups, wherein the hydrogel layer is covalently attached onto the anchor layer through linkages each formed between one first reactive functional group and one second reactive functional group, wherein the hydrogel coating has a thickness of about 0.1 µm to about 20 µm, wherein the soft contact lens has a surface lubricity better than the lubricity of the non-silicone hydrogel lens body and has a friction rating of about 2 or lower after 7 cycles of manual rubbing, a water content of from about 10% to about 85% by weight and an elastic modulus of from about 0.2 MPa to about 1.5 MPa when being fully hydrated at room temperature.

DETAILED DESCRIPTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"About" as used herein means that a number referred to as "about" comprises the recited number plus or minus 1-10% of that recited number.

"Optional" or "optionally" means that the subsequently described event or circumstance can or cannot occur, and that the description includes instances where the event or circumstance occurs and instances where it does not.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "non-silicone hydrogel contact lens" refers to a contact lens comprising a non-silicone hydrogel bulk (core) material.

A "soft contact lens" refers to a contact lens which has an elastic modulus (i.e., Young's modulus) of less than 2.0 MPa (preferably less than 1.5 MPa, more preferably less than 1.0 MPa).

A "hydrogel" or "hydrogel material" refers to a cross-linked polymeric material which has three-dimensional polymer networks (i.e., polymer matrix), is insoluble in water, but can hold at least 10 percent by weight of water in its polymer matrix when it is fully hydrated.

As used in this application, the term "non-silicone hydrogel" refers to a hydrogel that is theoretically free of silicon.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

"Surface hydrophilicity", as used herein, describes a surface property that represents the extent to which a surface interacts with water, as measured by water-break-up-time (WBUT). The higher the value of WBUT is, the higher the surface hydrophilicity is.

In accordance with the invention, the "surface lubricity" of a contact lens (or a medical device) is measured by a friction rating which is a number from 0 to 4. The higher the value of friction rating is, the lower the surface lubricity is.

"Hydrophilic," as used herein, describes a material or portion thereof that will more readily associate with water than with lipids.

A "vinylic monomer" refers to a compound that has one sole ethylenically-unsaturated group.

The term "soluble", in reference to a compound or material in a solvent, means that the compound or material can be dissolved in the solvent to give a solution with a concentration of at least about 0.05% by weight at room temperature (i.e., from about 20° C. to about 30° C.).

The term "insoluble", in reference to a compound or material in a solvent, means that the compound or material can be dissolved in the solvent to give a solution with a concentration of less than 0.005% by weight at room temperature (as defined above).

The term "ethylenically unsaturated group" is employed herein in a broad sense and is intended to encompass any groups containing at least one >C=C< group. Exemplary ethylenically unsaturated groups include without limitation (meth)acryloyl

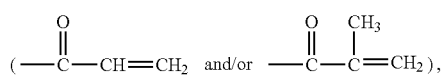

allyl, vinyl

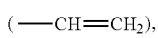

1-methylethenyl

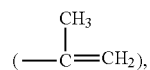

styrenyl, or the likes.

The term "(meth)acrylamide" refers to methacrylamide and/or acrylamide.

The term "(meth)acrylate" refers to methacrylate and/or acrylate.

An "acrylic monomer" refers to a vinylic monomer having one sole (meth)acryloyl group.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

A "hydrophilic vinylic monomer", as used herein, refers to a vinylic monomer which can be polymerized to form a homopolymer that is water-soluble or can absorb at least 10 percent by weight of water.

A "hydrophobic vinylic monomer" refers to a vinylic monomer which can be polymerized to form a homopolymer that is insoluble in water and can absorb less than 10 percent by weight of water.

As used in this application, the term "molecular weight" of a polymeric material (including monomeric or macromeric materials) refers to the weight-average molecular weight (Mw) unless otherwise specifically noted or unless testing conditions indicate otherwise.

A "macromer" or "prepolymer" refers to a compound or polymer that contains ethylenically unsaturated groups and has Mw of greater than 700 Daltons.

As used in this application, the term "vinylic crosslinker" refers to a compound having at least two ethylenically unsaturated groups. A "vinylic crosslinking agent" refers to a vinylic crosslinker having Mw of about 700 Daltons or less.

As used in this application, the term "polymer" means a material formed by polymerizing/crosslinking one or more monomers or macromers or prepolymers or combinations thereof.

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkyl triradical" refers to a trivalent radical obtained by removing two hydrogen atoms from an alkyl. A alkyl triradical forms three bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxy (—OH), carboxy (—COOH), —NH$_2$, sulfhydryl (—SH), C$_1$-C$_4$ alkyl, C$_1$-C$_4$ alkoxy, C$_1$-C$_4$ alkylthio (alkyl sulfide), C$_1$-C$_4$ acylamino, C$_1$-C$_4$ alkylamino, di-C$_1$-C$_4$ alkylamino, halogen atom (Br or Cl), and combinations thereof.

In this application, an "oxazoline" refers to a compound of

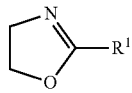

in which: R$^1$ is hydrogen, methyl, ethyl, N-pyrrolidonylmethyl, N-pyrrolidonylethyl, N-pyrrolidonylpropyl, or a monovalent radical of -alk-(OC$_2$H$_4$)$_{m3}$—OR" in which alk is C$_1$-C$_4$ alkyl diradical; R" is C$_1$-C$_4$ alkyl (preferably methyl); and m3 is an integer from 1 to 10 (preferably 1 to 5).

In this application, the term "polyoxazoline" refers to a linear polymer having a formula of

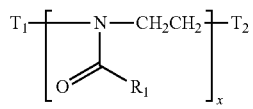

in which: T$_1$ and T$_2$ are two terminal groups; R$^1$ is hydrogen, methyl, ethyl, N-pyrrolidonylmethyl, N-pyrrolidonylethyl, N-pyrrolidonylpropyl, or a monovalent radical of -alk-(OC$_2$H$_4$)$_{m3}$—OR" in which alk is C$_1$-C$_4$ alkyl diradical; R" is C$_1$-C$_4$ alkyl (preferably methyl); m3 is an integer from 1 to 10 (preferably 1 to 5); x is an integer from 5 to 500. A polyoxazoline segment has a divalent polymer chain of a formula of

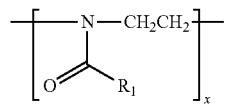

in which R$^1$ and x are as defined above.

In this application, the term "poly(2-oxazoline-co-ethyleneimine)" refers to a statistical copolymer having a formula of

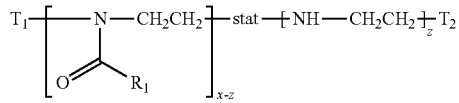

in which: T$_1$ and T$_2$ are terminal groups; R$^1$ is hydrogen, methyl, ethyl, N-pyrrolidonylmethyl, N-pyrrolidonylethyl, N-pyrrolidonylpropyl, or a monovalent radical of -alk-(OC$_2$H$_4$)$_{m3}$—OR" in which alk is C$_1$-C$_4$ alkyl diradical; R" is C$_1$-C$_4$ alkyl (preferably methyl); m3 is an integer from 1 to 10 (preferably 1 to 5); x is an integer from 5 to 500; z is an integer equal to or less than x. A poly(2-oxazoline-co-ethyleneimine) is obtained by hydrolyzing a polyoxazoline.

In this application, the term "poly(2-oxazoline-co-ethyleneimine)-epichlorohydrin" refers to a polymer obtained by reacting a poly(2-oxazoline-co-ethyleneimine) with epichlorohydrin to convert all or substantial percentage (90%) of the secondary amine groups of the poly(2-oxazoline-co-ethyleneimine) into azetidinium groups. Examples of poly(2-oxazoline-co-ethyleneimine)-epichlorohydrin are disclosed in U.S. pat. Appl. pub. No. 2016/0061995 A1 (herein incorporated by reference in its entirety).

An "epichlorohydrin-functionalized polyamine" or "epichlorohydrin-functionalized polyamidoamine" refers to a polymer obtained by reacting a polyamine or polyamidoamine with epichlorohydrin to convert all or a substantial percentage of the secondary amine groups of the polyamine or polyamidoamine into azetidinium groups.

The term "polyamidoamine-epichlorohydrin" refers to an epichlorohydrin-functionalized adipic acid-diethylenetriamine copolymer.

In this application the term "azetidinium" or "3-hydroxyazetidinium" refers to a positively-charged, divalent radical (or group or moiety) of

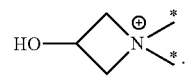

The term "azlactone" refers to a mono-valent radical of formula

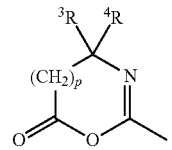

in which p is 0 or 1; $^3$R and $^4$R independently of each other is C$_1$-C$_8$ alkyl (preferably methyl).

The term "aziridine group" refers to a mono-valent radical of formula

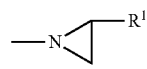

in which R$^1$ is hydrogen, methyl or ethyl.

The term "vinyl sulfone group" refers to a mono-valent radical of formula

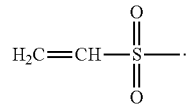

The term "thermally-crosslinkable" in reference to a polymeric material or a functional group means that the polymeric material or the functional group can undergo a crosslinking (or coupling) reaction with another material or functional group at a relatively-elevated temperature (from about 40° C. to about 140° C.), whereas the polymeric material or functional group cannot undergo the same crosslinking reaction (or coupling reaction) with another material or functional group at room temperature (i.e., from about 22° C. to about 28° C., preferably from about 24° C. to about 26° C., in particular at about 25° C.) to an extend detectable for a period of about one hour.

As used in this application, the term "phosphorylcholine" refers to a monovalent zwitterionic group of

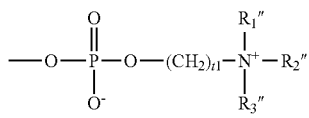

in which t1 is an integer of 1 to 5 and $R_1''$, $R_2''$ and $R_3''$ independently of one another are $C_1$-$C_8$ alkyl or $C_1$-$C_8$ hydroxyalkyl.

As used in this application, the term "reactive vinylic monomer" refers to any vinylic monomer having at least one reactive functional group selected from the group consisting of carboxyl group, primary amino group, and secondary amino group.

As used in this application, the term "non-reactive vinylic monomer" refers to any vinylic monomer (either hydrophilic or hydrophobic vinylic monomer) free of carboxyl group, primary amino group, secondary amino group, epoxide group, isocyanate group, azlactone group, or aziridine group.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

A "spatial limitation of actinic radiation" refers to an act or process in which energy radiation in the form of rays is directed by, for example, a mask or screen or combinations thereof, to impinge, in a spatially restricted manner, onto an area having a well-defined peripheral boundary. A spatial limitation of UV radiation is obtained by using a mask or screen having a radiation (e.g., UV and/or visible light) permeable region, a radiation (e.g., UV and/or visible light) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV radiation and/or visible radiation) having a cross-sectional profile defined by the projection contour of the mask or screen. The projected beam of radiation (e.g., UV radiation and/or visible radiation) limits radiation impinging on a lens formulation located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV and/or visible beam (i.e., a spatial limitation of radiation). The radiation used for the crosslinking is radiation energy, especially UV radiation (and/or visible radiation), gamma radiation, electron radiation or thermal radiation, the radiation energy preferably being in the form of a substantially parallel beam in order on the one hand to achieve good restriction and on the other hand efficient use of the energy.

The term "modulus" or "elastic modulus" in reference to a contact lens or a material means the tensile modulus or Young's modulus which is a measure of the stiffness of a contact lens or a material. The modulus can be measured using a method in accordance with ANSI Z80.20 standard. A person skilled in the art knows well how to determine the elastic modulus of a silicone hydrogel material or a contact lens. For example, all commercial contact lenses have reported values of elastic modulus.

A "water contact angle" refers to an average water contact angle (i.e., contact angles measured by Sessile Drop method) at the room temperature, which is obtained by averaging measurements of contact angles with at least 3 individual contact lenses.

The term "durability" in reference to a coating on a hydrogel contact lens is intended to describe that the coating on the hydrogel contact lens can survive a desired number of cycles of manual rubbings.

As used herein, "surviving a number ("j") of cycles of manual rubbings" in reference to a coating on a contact lens means that after j cycles of manual rubbing according to the procedure described in Example 1, the contact lens has a manual-rubbing-induced increase in friction rating after j cycles of manual rubbings, $\Delta FR_{DR}(j)$, of about 60% or less (preferably about 50% or less, more preferably about 40% or less, even more preferably about 30% or less), wherein $$\Delta FR_{DR}(j) = \frac{FR_{jDR} - FR_{0DR}}{4} \times 100\%$$

in which $FR_{0DR}$ is the friction rating of the contact lens which is in fully-hydrated state and is subjected to zero manual rubbing, and $FR_{jDR}$ is the friction rating of the contact lens which is in fully hydrated state and has been subjected to j cycles of manual rubbings, wherein j is an integer of 2 (preferably 7, more preferably 14, even more preferably 30).

The term "one cycle of manual rubbing" means that contact lenses (or medical devices) with a coating thereon are manually rubbed (wearing disposable powder-free latex gloves) with RENU® multi-purpose lens care solution (or another multi-purpose lens care solution) for 20 seconds and then rinsed with saline. The above procedure can be repeated for a given times, e.g., from 2 to 30 times and number of repetitions of manual rubbings is the number of cycles of manual rubbings.

An "aqueous solution" or a "water-based solution" interchangeably refers to a solution which is a homogeneous mixture consisting of a water-based solvent and one or more solutes dissolved in the water-based solvent. A "water-based solvent" is intended to describe a solvent system which consists of at least 70%, preferably at least 80%, more preferably at least 90%, even more preferably at least 95%) by weight of water and at most 30% (preferably about 20% or less, more preferably about 10% or less, even more preferably about 5% or less, in particular about 2% or less) by weight of one or more organic solvents relative to the weight of the solvent system. An aqueous coating solution refers to an aqueous solution containing at least one polymeric coating material as a solute in the solution.

An "organic-based solution" refers to a solution which is a homogeneous mixture consisting of an organic-based solvent and one or more solutes dissolved in the organic based solvent. An "organic-based solvent" is intended to describe a solvent system which consists of one or more organic solvents and less than 40%, preferably about 30% or less, more preferably about 20% or less, even more preferably about 10% or less, in particular about 5% or less by weight of water relative to the weight of the solvent system. An organic-based coating solution refers to an organic-based solution containing at least one polymeric coating material as a solute in the solution.

The invention is generally related to a new class of soft contact lenses each of which comprises a non-silicone hydrogel lens body (i.e., a non-silicone hydrogel substrate having a 3-dimensional shape of a contact lens) and a soft and lubricious hydrogel coating thereon. Currently, almost all non-silicone hydrogel contact lenses in the market do not have any permanent coating thereon, because the lens body of each of those lenses essentially consists of a hydrogel material which is free of silicone and has an inherently-hydrophilic and wettable surface. It is commonly believed in the art that there is no need for such non-silicone hydrogel contact lenses to be subjected to any surface treatment to have a permanent coating thereon. In contrast, each of soft contact lenses of the invention has a permanent hydrogel coating thereon, even though the lens body of each soft contact lens essentially consists of a hydrophilic polymeric material (i.e., a hydrogel material) which has an inherently-hydrophilic and inherently-wettable surface.

The invention is partly based on the discovery that the wearing comfort of a non-silicone hydrogel contact lens can be significantly enhanced by applying a soft and lubricious hydrogel coating onto a preformed non-silicone hydrogel contact lens (which becomes the lens body), so long as the soft lubricious hydrogel coating has an adequate thickness (such as, at least 0.1 µm (preferably at least 0.25 µm, more preferably at least 0.5 µm, even more preferably from about 1 µm to about 10 µm). Because the non-silicone hydrogel lens body provides bulk mechanical strength and rigidity required for a contact lens, the hydrogel coating may have no limit with respect to the water content and the elastic modulus (a.k.a., softness) and can contain water as much as possible and can be as soft as possible, thereby providing the contact lens with a water-rich and super-soft skin for superior wearing comfort. However, if the hydrogel coating is too thin, it would be susceptible to be totally collapsed onto the lens bulk material by a slight compressing force, losing the advantages associated with the soft and lubricious hydrogel coating. The wearing comfort provided by a contact lens of the invention would increase with the increase of the thickness of its hydrogel coating and then level off after a certain thickness value.

The invention is also partly based on the discovery that a relatively-thick, stable anchor layer is required for forming a hydrogel coating having an adequate thickness. The thicker the anchor layer, the thicker the hydrogel coating. It is discovered that a water-based coating process can be used to apply an anchoring layer of a polyanionic polymer (e.g., polyacrylic acid or polymethacrylic acid or the like) onto a preformed non-silicone hydrogel contact lens composed of a polymer comprising at least 50% by mole of repeating units of at least one hydroxyl-containing vinylic monomer and optionally repeating units of an amide-containing vinylic monomer. It is believed that hydrogen-bonds formed between hydroxyl groups and carboxyl groups (in protonated form) at low pH (i.e., lower than about 4.0) may be sufficient to allow the non-silicone hydrogel contact lens bind stably a layer of the polyanionic polymer. It is also discovered that the water-based coating process has no or minimal impact on the properties of the preformed non-silicone hydrogel contact lens so as to maintain all the beneficial attributes of the preformed non-silicone hydrogel contact lens, for example, such as, softness, elongation, eye-blink-induced lubricant release, etc. By having a layer of polyanionic polymer as an anchoring layer, a hydrogel layer with an adequate thickness then can be formed and covalently attached onto the anchoring layer.

In one aspect, the invention provides a method for producing soft contact lenses, comprising the steps of: (1) obtaining a preformed non-silicone hydrogel contact lens (preferably a preformed polyvinylalcohol-based hydrogel contact lens), wherein the preformed hydrogel contact lens is composed of a polymer comprising at least 50% by mole of repeating units of at least one hydroxyl-containing vinylic monomer; (2) contacting the preformed hydrogel contact lens with a first aqueous coating solution of a polyanionic polymer at a pH of about 4.0 or less (preferably about 3.5 or less, more preferably about 3.0 or less, even more preferably from about 0.5 to about 2.5) and at a coating temperature of from about 25° C. to about 80° C. (preferably from about 30° C. to about 75° C., more preferably from about 35° C. to about 70° C., even more preferably from about 40° C. to about 60° C.) to obtain a soft contact lens precursor which is the preformed non-silicone hydrogel contact lens having a layer of the polyanionic polymer thereon, wherein the polyanionic polymer is one or more homo- or copolymers of acrylic acid, methacrylic acid, ethylacrylic acid, or 2-(meth)acrylamidoglycolic acid; and (3) heating the soft contact lens precursor obtained in step (2), in a second aqueous coating solution which comprises a water-soluble and thermally-crosslinkable hydrophilic polymeric material having azetidinium groups, at a temperature of from about 60° C. to about 140° C. for at least 30 minutes to crosslink the water-soluble thermally-crosslinkable hydrophilic polymeric material and the polyanionic polymer so as to form the soft contact lens with a hydrogel coating which is covalently attached onto the layer of the polyanionic polymer, wherein the soft contact lens in fully hydrated state has a friction rating of about 2 or lower (preferably about 1.5 or lower, more preferably about 1.0 or lower, even more preferably about 0.5 or lower) after 7 cycles of manual rubbing, provided that the elastic modulus of the soft contact lens is equal to the elastic modulus of the preformed non-silicone hydrogel contact lens within a margin of about ±10% or less (preferably about ±8%, even more preferably about ±6%).

In accordance with the invention, a preformed non-silicone hydrogel contact lens is any non-silicone hydrogel contact lens, which is produced according to any lens manufacturing processes (or so-called "preformed silicone hydrogel contact lens") and has not been subjected to any surface treatment after lens-forming process, so long as it is composed of a polymer comprising at least 50% by mole of repeating units of one or more hydroxyl-containing vinylic monomers. A person skilled in the art knows hydroxyl-containing vinylic monomers suitable for making hydrogel contact lenses. Examples of preferred hydroxyl-containing vinylic monomers includes without limitation hydroxyethyl (meth)acrylate, 2-hydroxypropyl (meth)acrylate, 3-hydroxypropyl (meth)acrylate, glycerol (meth)acrylate, N-2-hydroxyethyl (meth)acrylamide, N-2-hydroxypropyl (meth)acrylamide, N-3-hydroxypropyl (meth)acrylamide, N,N-bis(hydroxyethyl) (meth)acrylamide, N-2,3-dihydroxypropyl (meth)acrylamide, N-tris(hydroxymethyl)methyl (meth)acrylamide, vinyl alcohol, allyl alcohol, and combinations thereof. Optionally but preferably, the preformed non-silicone hydrogel contact lens which is composed of polymer comprising at least 50% by mole of repeating units of at least one hydroxyl-containing vinylic monomer and repeating units of at least one amide-containing vinylic monomer, at least one carboxyl-containing acrylic monomer, and/or at least one acrylic monomer having a primary or secondary amino group. It is believed that the amide group in such an amide-containing vinylic monomer can form hydrogen bonds with carboxyl groups.

Examples of preferred amide-containing vinylic monomers include without limitation (meth)acrylamide, N,N-dimethyl (meth)acrylamide, N-vinylpyrrolidone (NVP), N-vinyl formamide, N-vinyl acetamide, N-vinyl isopropylamide, N-vinyl-N-methyl acetamide, N,N-dimethylaminopropyl (meth)acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, and combinations thereof.

Examples of preferred carboxyl-containing acrylic monomers include without limitation acrylic acid, methacrylic acid, ethylacrylic acid, 2-acrylamidoglycolic acid, 2-methacrylamidoglycolic acid, or combinations thereof.

Examples of preferred acrylic monomers having a primary or secondary amino group include without limitation N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, or combinations thereof.

Currently, most commercially-available non-silicone hydrogel contact lenses are made of a copolymer hydroxyethyl (meth)acrylate with one or more vinylic monomers and one or more vinylic crosslinking agents, a copolymer of glycerol (meth)acrylate with one or more vinylic monomers and one or more vinylic crosslinking agents, a crosslinked polyvinylalcohol.

For production of preformed hydrogel contact lenses, a hydrogel lens formulation typically is: either (1) a monomer mixture comprising (a) at least one hydroxyl-containing vinylic monomer and one or more other hydrophilic vinylic monomers and (b) at least one component selected from the group consisting of a vinylic crosslinking agent, a hydrophobic vinylic monomer, an internal wetting agent, a free-radical initiator (photoinitiator or thermal initiator), a UV-absorbing agent, a visibility tinting agent (e.g., dyes, pigments, or mixtures thereof), antimicrobial agents (e.g., preferably silver nanoparticles), a bioactive agent, and combinations thereof; or (2) an aqueous solution comprising one or more water-soluble prepolymers and at least one component selected from the group consisting of hydrophilic vinylic monomer, a vinylic crosslinking agent, a hydrophobic vinylic monomer, an internal wetting agent, a free-radical initiator (photoinitiator or thermal initiator), a UV-absorbing agent, a visibility tinting agent (e.g., dyes, pigments, or mixtures thereof), antimicrobial agents (e.g., preferably silver nanoparticles), a bioactive agent, and combinations thereof. Resultant preformed hydrogel contact lenses then can be subjected to extraction with an extraction solvent to remove unpolymerized components from the resultant lenses and to hydration process, as known by a person skilled in the art. It is understood that an internal wetting agent present in a hydrogel lens formulation can improve the hydrophilicity (as measured by water-break-up-time, WBUT) and/or wettability (as measured by water contact angle, WCA) of preformed hydrogel contact lenses compared to those of control preformed hydrogel contact lenses obtained from a control hydrogel lens formulation without the internal wetting agent.

In a preferred embodiment, the preformed non-silicone hydrogel contact lens is a polyvinylalcohol-based hydrogel contact lens. More preferably, a preformed polyvinylalcohol-based hydrogel contact lens is obtained by polymerizing an aqueous lens-forming composition comprising a water-soluble, actinically-crosslinkable polyvinyl alcohol prepolymer which comprises:

repeating units of vinyl alcohol

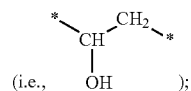

(i.e., $\overset{\text{CH}_2}{\underset{\text{OH}}{\text{CH}}}$ );

repeating crosslinking units of formula (I); and

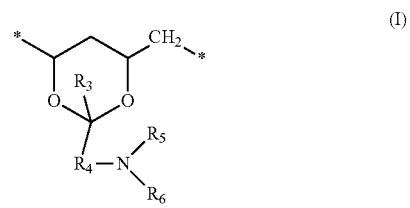

in which:

$R_3$ can be hydrogen or a $C_1$-$C_6$ alkyl group (preferably hydrogen);

$R_4$ is a $C_1$-$C_6$ alkylene divalent radical (preferably a $C_1$-$C_4$ alkylene divalent radical, more preferably methylene or butylene divalent radical, even more preferably methylene divalent radical);

$R_5$ is hydrogen or $C_1$-$C_6$ alkyl (preferably hydrogen or $C_1$-$C_4$ alkyl, more preferably hydrogen or methyl or ethyl, even more preferably hydrogen or methyl);

$R_6$ is an ethylenically unsaturated group of

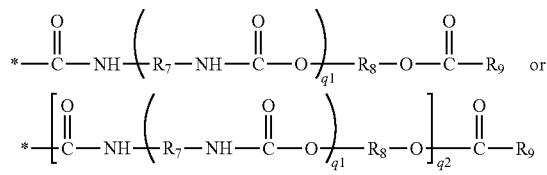

in which q1 and q2 independently of each another are zero or one, and $R_7$ and $R_8$ independently of one another are a $C_2$-$C_8$ alkylene divalent radical, $R_9$ is $C_2$-$C_8$ alkenyl.

In a preferred embodiment, wherein $R_4$ is methylene divalent radical, $R_5$ is hydrogen or $C_1$-$C_4$ alkyl, $R_3$ is hydrogen, and $R_6$ is a radical of

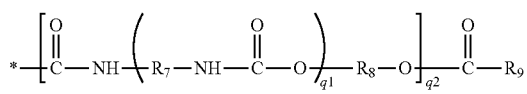

in which q2 is zero, $R_9$ is vinyl (*—CH=CH$_2$) or 1-methylethenyl (*—C(CH$_3$)=CH$_2$).

In another preferred embodiment, the polyvinylalcohol prepolymer has a weight average molecular weight of at least about 2,000 Daltons, and comprises from about 1% to about 25% by mole, preferably from about 2% to about 15% by mole of the repeating units of formula (I).

A water-soluble, actinically-crosslinkable polyvinylalcohol prepolymer can be prepared using techniques known in the art, e.g., those disclosed in U.S. Pat. Nos. 5,583,163 and 6,303,687 (herein incorporated by references in their entireties).

Preferably, the polyvinylalcohol prepolymers are purified in a manner known per se, for example by precipitation with organic solvents, such as acetone, filtration and washing, extraction in a suitable solvent, dialysis or ultrafiltration, ultrafiltration being especially preferred. By means of that purification process the prepolymers can be obtained in extremely pure form, for example in the form of concentrated aqueous solutions that are free, or at least substantially free, from reaction products, such as salts, and from starting materials, such as, for example, non-polymeric constituents.

The preferred purification process for the prepolymers used in the process according to the invention, ultrafiltration, can be carried out in a manner known per se. It is possible for the ultrafiltration to be carried out repeatedly, for example from two to ten times. Alternatively, the ultrafiltration can be carried out continuously until the selected degree of purity is attained. The selected degree of purity can in principle be as high as desired. A suitable measure for the degree of purity is, for example, the concentration of dissolved salts obtained as by-products, which can be determined simply in known manner.

It would be advantageous that the water-soluble actinically-crosslinkable polyvinylalcohol prepolymers are in a substantially pure form (e.g., purified by ultrafiltration to remove most reactants for forming the prepolymer). Therefore, after crosslinking by actinic radiation, a contact lens may require practically no more subsequent purification, such as in particular complicated extraction of unpolymerized constituents. Furthermore, crosslinking may take place in aqueous solution, so that a subsequent solvent exchange or the hydration step is not necessary.

In another preferred embodiment, the aqueous lens-forming composition further comprises a first leachable polymeric lubricant, and a second leachable polymeric lubricant, wherein the second leachable polymeric lubricant is different from the first leachable polymeric lubricant in molecular weight or in the polymer composition (i.e., made of different monomer units or same monomer units but different percentage), preferably has a molecular weight of being at least 3 folds of the molecular weight of the first leachable polymeric lubricant. It is believed that when the average molecular weights of two or more polymeric lubricants are different from each other to an extent so large, their release may occur at a different time scale: the lubricant with low molecular weight releasing first and the lubricant with higher molecular weight releasing later. By having at least about 3 fold differences in molecular weight between two lubricants, one can ensure that the higher molecular weight lubricant would release into the eye after about 6 hours of wearing time.

A "leachable polymeric lubricant" as used herein refers to a non-crosslinkable hydrophilic polymer, which is not covalently bound to but instead is associated with or entrapped in the polymer matrix of a contact lens and which can enhance surface wettability of a contact lens and/or the eye or reduce the frictional character of the contact lens surface.

In accordance with the invention, leachable polymeric lubricants are non-crosslinkable hydrophilic polymers (i.e. without actinically-crosslinkable groups) preferably having no charges. Any suitable hydrophilic polymers can be used so long as they are compatible with the lens-forming material (i.e., can produce optically clear contact lenses). Exemplary non-crosslinkable (i.e. without actinically-crosslinkable groups) hydrophilic polymers include, but are not limited to, polyvinyl alcohols (PVAs); polyamides; polyimides; polylactone; a homopolymer of N-vinylpyrrolidone; a copolymer of N-vinylpyrrolidone with one or more hydrophilic vinylic comonomers; a homopolymer of (meth)acrylamide; a copolymer of (meth)acrylamide with one or more hydrophilic vinylic monomers; a homopolymer of N-vinyl-N-methyl acetamide; a copolymer of N-vinyl-N-methyl acetamide with one or more hydrophilic vinylic monomers; a homopolymer of $C_2$-$C_3$ hydroxylalkyl (meth)acrylamide; a copolymer of $C_2$-$C_3$ hydroxylalkyl (meth)acrylamide with one or more hydrophilic vinylic monomer; a copolymer of a phosphrylcholine-containing vinylic monomer with one or more hydrophilic vinylic monomers; poly(ethylene oxide) (PEO); poly(2-ethyl oxazoline); heparin polysaccharides; polysaccharides; and mixtures thereof.

The weight-average molecular weight $M_w$ of the non-crosslinkable hydrophilic polymer (i.e., leachable polymeric lubricant) is at least 10,000 Daltons, preferably at least 20,000 Daltons, more preferably at least 50,000 Daltons.

Examples of polyvinylpyrrolidone (PVP) include without limitation those polymer characterized by molecular weight grades of K-15, K-30, K-60, K-90, K-120, and the likes.

Examples of copolymers of N-vinylpyrrolidone with one or more vinylic monomers includes without limitation vinylpyrrolidone/vinylacetate copolymers, vinylpyrrolidone/dimethylaminoethylmethacrylate copolymers (e.g., Copolymer 845, Copolymer 937, Copolymer 958 from ISP Corporation), vinylpyrrolidone/vinylcaprolactam/dimethylaminoethylmethacrylate copolymer.

A suitable polyoxyethylene derivative is, for example, n-alkylphenyl polyoxyethylene ether, n-alkyl polyoxy-ethylene ether (e.g., TRITON®), polyglycol ether surfactant (TERGITOL®), polyoxyethylenesorbitan (e.g., TWEEN®), polyoxyethylated glycol monoether (e.g., BRIJ®, polyoxylethylene 9 lauryl ether, polyoxylethylene 10 ether, polyoxylethylene 10 tridecyl ether), or a block copolymer of ethylene oxide and propylene oxide.

Examples of block copolymers of ethylene oxide and propylene oxide include without limitation poloxamers and poloxamines, which are available, for example, under the tradename PLURONIC®, PLURONIC-R®, TETRONIC®, TETRONIC-R® or PLURADOT®. Poloxamers are triblock copolymers with the structure PEO—PPO-PEO (where "PEO" is poly(ethylene oxide) and "PPO" is poly(propylene oxide).

A considerable number of poloxamers is known, differing merely in the molecular weight and in the PEO/PPO ratio; Examples of poloxamers include 101, 105, 108, 122, 123, 124, 181, 182, 183, 184, 185, 188, 212, 215, 217, 231, 234, 235, 237, 238, 282, 284, 288, 331, 333, 334, 335, 338, 401, 402, 403 and 407. The order of polyoxyethylene and polyoxypropylene blocks can be reversed creating block copolymers with the structure PPO-PEO-PPO, which are known as PLURONIC-R® polymers.

Poloxamines are polymers with the structure (PEO-PPO)$_2$—N—(CH$_2$)$_2$—N—(PPO-PEO)$_2$ that are available with different molecular weight and PEO/PPO ratios. Again, the order of polyoxyethylene and polyoxypropylene blocks can be reversed creating block copolymers with the structure (PPO-PEO)$_2$—N—(CH$_2$)$_2$—N—(PEO-PPO)$_2$, which are known as TETRONIC-R® polymers.

Polyoxypropylene-polyoxyethylene block copolymers can also be designed with hydrophilic blocks comprising a random mix of ethylene oxide and propylene oxide repeating units. To maintain the hydrophilic character of the block, ethylene oxide will predominate. Similarly, the hydrophobic block can be a mixture of ethylene oxide and propylene oxide repeating units. Such block copolymers are available under the tradename PLURADOT®.

Non-crosslinkable PVAs of all kinds, for example those with low, medium or high polyvinyl acetate contents may be employed. In addition, the PVAs used may also comprise small proportions, for example up to 20%, preferably up to 16%, of copolymer units as mentioned before. The use of non-reactive PVAs with a contents of polyvinyl acetate units of less than 20%, preferably lower than 16%, is preferred.

The non-crosslinkable polyvinyl alcohols employed in the present invention are known and are commercially available, for example under the brand name Mowiol® from KSE (Kuraray Specialties Europe) or Gohsenol (Nippon Gohsei, Japan).

Examples of a copolymer of a phosphrylcholine-containing vinylic monomer with one or more hydrophilic vinylic monomers include without limitation Lipidure® polymers from NOF.

It is understood that the addition of the leachable polymeric lubricants into the lens formulation should not affect adversely the optical transparency of the result lenses. The leachable lubricants can be the same polymers having different molecular weight or different polymers having different molecular weight.

Preferably, a preformed polyvinylalcohol-based hydrogel contact lens is obtained by: introducing an aqueous lens-forming composition including a water-soluble, actinically-crosslinkable polyvinyl alcohol prepolymer described above into a reusable mold and curing under a spatial limitation of actinic radiation the aqueous lens-forming composition.

Preferably, a reusable mold suitable for spatial limitation of radiation is used in the invention, the projected beam of radiation (e.g., radiation from the light source including the light in the region of 360 nm to 550 nm) limits radiation (e.g., UV radiation) impinging on the mixture of the lens-forming materials located in the path of the projected beam from the first molding surface to the second molding surface of the reusable mold. The resultant contact lens comprises an anterior surface defined by the first molding surface, an opposite posterior surface defined by the second molding surface, and a lens edge (with sharp edge and high quality) defined by the sectional profile of the projected radiation beam (i.e., a spatial limitation of radiation). Examples of reusable molds suitable for spatial limitation of radiation include without limitation those disclosed in U.S. Pat. Nos. 6,627,124, 6,800,225, 7,384,590, and 7,387,759, which are incorporated by reference in their entireties.

For example, a preferred reusable mold comprises a first mold half having a first molding surface and a second mold half having a second molding surface. The two mold halves of the preferred reusable mold are not touching each other, but there is a thin gap of annular design arranged between the two mold halves. The gap is connected to the mold cavity formed between the first and second molding surfaces, so that excess mixture can flow into the gap. It is understood that gaps with any design can be used in the invention.

In a preferred embodiment, at least one of the first and second molding surfaces is permeable to a crosslinking radiation. More preferably, one of the first and second molding surfaces is permeable to a crosslinking radiation while the other molding surface is poorly permeable to the crosslinking radiation.

The reusable mold preferably comprises a mask which is fixed, constructed or arranged in, at or on the mold half having the radiation-permeable molding surface. The mask is impermeable or at least of poor permeability compared with the permeability of the radiation-permeable molding surface. The mask extends inwardly right up to the mold cavity and surrounds the mold cavity so as to screen all areas behind the mask with the exception of the mold cavity.

The mask may preferably be a thin chromium layer, which can be produced according to processes as known, for example, in photo and UV lithography. Other metals or metal oxides may also be suitable mask materials. The mask can also be coated with a protective layer, for example of silicon dioxide if the material used for the mold or mold half is quartz.

Alternatively, the mask can be a masking collar made of a material comprising a UV/visible light-absorber and substantially blocks curing energy therethrough as described in U.S. Pat. No. 7,387,759 (incorporated by reference in its entirety). In this preferred embodiment, the mold half with the mask comprises a generally circular disc-shaped transmissive portion and a masking collar having an inner diameter adapted to fit in close engagement with the transmissive portion, wherein said transmissive portion is made from an optically clear material and allows passage of curing energy therethrough, and wherein the masking collar is made from a material comprising a light-blocker and substantially blocks passage of curing energy therethrough, wherein the masking collar generally resembles a washer or a doughnut, with a center hole for receiving the transmissive portion, wherein the transmissive portion is pressed into the center opening of the masking collar and the masking collar is mounted within a bushing sleeve.

Reusable molds can be made of quartz, glass, sapphire, CaF$_2$, a cyclic olefin copolymer (such as for example, Topas® COC grade 8007-S10 (clear amorphous copolymer of ethylene and norbornene) from Ticona GmbH of Frankfurt, Germany and Summit, N.J. Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc. Because of the reusability of the mold halves, a relatively high outlay can be expended at the time of their production in order to obtain molds of extremely high precision and reproducibility. Since the mold halves do not touch each other in the region of the lens to be produced, i.e. the cavity or actual molding surfaces, damage as a result of contact is ruled out. This ensures a high service life of the molds, which, in particular, also ensures high reproducibility of the contact lenses to be produced and high fidelity to the lens design.

In accordance with the invention, contacting of a preformed non-silicone hydrogel contact lens with a first aqueous coating solution can occur by dipping it into the first aqueous coating solution or by spraying it with the first aqueous coating solution. One contacting process involves solely dipping the preformed non-silicone hydrogel contact lens in a bath of a first aqueous coating solution for a period of time or alternatively dipping the preformed non-silicone hydrogel contact lens sequentially in a series of bath of first aqueous coating solutions for a fixed shorter time period for each bath. Another contacting process involves solely spray a first aqueous coating solution. However, a number of alternatives involve various combinations of spraying- and dipping-steps may be designed by a person having ordinary skill in the art. Preferably, the step of contacting is performed by dipping the preformed non-silicone hydrogel contact lens in the first aqueous coating solution.

The first aqueous coating solution has a pH of about 4 or less, preferably about 3.5 or less, more preferably about 3.0 or less, even more preferably from about 0.5 to about 2.5.

The first aqueous coating solution has a temperature (i.e., coating temperature) of from about 25° C. to about 80° C. (preferably from about 30° C. to about 75° C., more preferably from about 35° C. to about 70° C., even more preferably from about 40° C. to about 60° C.).

The preformed non-silicone hydrogel contact lens is in contact with the first aqueous coating solution for a contacting time of at least about one minute, preferably at least about 5 minutes, more preferably at least about 10 minutes, even more preferably at least about 30 minutes.

In accordance with the invention, the polyanionic polymer is one or more homo- or copolymers of acrylic acid, methacrylic acid, ethylacrylic acid, or 2-(meth)acrylamidoglycolic acid; preferably is poly(acrylic acid) (PAA), poly(methacrylic acid) (PMAA), poly(acrylic acid-co-methacrylic acid) (pAA-pMAA), poly(ethylacrylic acid) (PEAA), poly(acrylic acid-co-ethylacrylic acid) (pAA-pEAA), poly(methacrylic acid-co-ethylacrylic acid) (pMAA-pEAA), poly(2-(meth)acrylamidoglycolic acid), or a combination thereof; more preferably is poly(acrylic acid) (PAA), poly(methacrylic acid) (PMAA), poly(acrylic acid-co-methacrylic acid) (pAA-pMAA), or a combination thereof. The polyanionic polymer has a weight average molecular weight of at least 100,000 Daltons (preferably from 200,000 to 10,000,000 Daltons, more preferably from 300,000 to 5,000,000 Daltons, even more preferably from 400,000 to 3,000,000 Daltons).

In accordance with a preferred embodiment of the invention, a water-soluble and thermally-crosslinkable hydrophilic polymeric material comprises azetidinium groups and is a partial reaction product of at least one azetidinium-containing polymer with at least one hydrophilicity-enhancing agent (i.e., a wetting agent) having at least one carboxyl, primary amine, secondary amine, or thiol group, according to the crosslinking reactions shown in Scheme I Scheme I

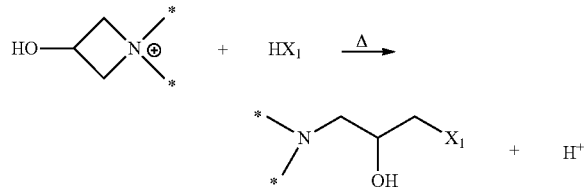

in which $X_1$ is —S—*, —OC(=O)—*, or —NR'—* in which R' is hydrogen or a $C_1$-$C_4$ unsubstituted or substituted alkyl group, and * represents an organic radical.

Any suitable azetidinium-containing polymers can be used in the invention. Examples of azetidinium-containing polymers includes without limitation epichlorohydrin-functionalized polyamines, homopolymers of an azetidinium-containing vinylic monomer, copolymers of an azetidinium-containing vinylic monomer with one or more vinylic monomers.

Preferably, an azetidinium-containing polymer is an epichlorohydrin-functionalized polyamine. An epichlorohydrin-functionalized polyamine can be obtained by reacting epichlorohydrin with a polyamine polymer or a polymer containing secondary amino groups. For example, a poly(alkylene imines) or a poly(amidoamine) which is a polycondensate derived from a polyamine and a dicarboxylic acid (e.g., adipic acid-diethylenetriamine copolymers) can react with epichlorohydrin to form an epichlorohydrin-functionalized polymer; a homopolymer or copolymer of mono-alkylaminoalkyl (meth)acrylate or mono-alkylaminoalkyl (meth)acrylamide can also react with epichlorohydrin to form an epichlorohydrin-functionalized polyamine; a poly(2-oxazoline-co-ethyleneimine) copolymer can react with epichlorohydrin to form an epichlorohydrin-functionalized polyamine (i.e., a poly(2-oxazoline-co-ethyleneimine)-epichlorohydrin). The reaction conditions for epichlorohydrin-functionalization of a polyamine or polyamidoamine polymer are taught in EP1465931 (herein incorporated by reference in its entirety). A preferred epichlorohydrin-functionalized polyamine is polyamidoamine-epichlorohydrin (PAE) or a poly(2-oxazoline-co-ethyleneimine)-epichlorohydrin.

Polyamidoamine-epichlorohydrin is commercially available, such as, for example, Kymene® or Polycup® resins (epichlorohydrin-functionalized adipic acid-diethylenetriamine copolymers) from Hercules.

Poly(2-oxazoline-co-ethyleneimine)-epichlorohydrin can be prepared according to procedures described in U.S. Pat. Appl. Pub. No. US 2016/0061995 A1 (herein incorporated by reference in its entirety).

Homopolymers and copolymers of an azetidinium-containing vinylic monomer can be obtained according to the procedures described in U.S. Pat. Appl. Pub. No. 2013/0337160A1 (herein incorporated by reference in its entirety).

Any suitable hydrophilicity-enhancing agents can be used in the invention so long as they are ophthalmically compatible and contain at least one primary or secondary amino group, at least one carboxyl group, and/or at least one thiol group.

A preferred class of hydrophilicity-enhancing agents include without limitation: primary amino-, secondary amino-, carboxyl- or thiol-containing monosaccharides (e.g., 3-amino-1,2-propanediol, 1-thiolglycerol, 5-keto-D-gluconic acid, galactosamine, glucosamine, galacturonic acid, gluconic acid, glucosaminic acid, mannosamine, saccharic acid 1,4-lactone, saccharide acid, Ketodeoxynonulosonic acid, N-methyl-D-glucamine, 1-amino-1-deoxy-β-D-galactose, 1-amino-1-deoxysorbitol, 1-methylamino-1-deoxysorbitol, N-aminoethyl gluconamide); primary amino-, secondary amino-, carboxyl- or thiol-containing disaccharides (e.g., chondroitin disaccharide sodium salt, di(β-D-xylopyranosyl)amine, digalacturonic acid, heparin disaccharide, hyaluronic acid disaccharide, Lactobionic acid); and primary amino-, secondary amino-, carboxyl- or thiol-containing oligosaccharides (e.g., carboxymethyl-β-cyclodextrin sodium salt, trigalacturonic acid); and combinations thereof.

Another preferred class of hydrophilicity-enhancing agents is hydrophilic polymers having one or more (primary or secondary) amino, carboxyl and/or thiol groups. More preferably, the content of the amino (—NHR' with R' as defined above), carboxyl (—COOH) and/or thiol (—SH) groups in a hydrophilic polymer as a hydrophilicity-enhancing agent is less than about 40%, preferably less than about 30%, more preferably less than about 20%, even more preferably less than about 10%, by weight based on the total weight of the hydrophilic polymer.

One preferred class of hydrophilicity-enhancing agents are (primary or secondary) amino- or carboxyl-containing polysaccharides, for example, such as, carboxymethylcellulose (having a carboxyl content of about 40% or less, which is estimated based on the composition of repeating units, —[$C_6H_{10-m}O_5(CH_2CO_2H)_m$]— in which m is 1 to 3), carboxyethylcellulose (having a carboxyl content of about 36% or less, which is estimated based on the composition of repeating units, —[$C_6H_{10-m}O_5(C_2H_4CO_2H)_m$]— in which m is 1 to 3) carboxypropylcellulose (having a carboxyl content of about 32% or less, which is estimated based on the composition of repeating units, —[$C_6H_{10-m}O_5(C_3H_6CO_2H)_m$]—, in which m is 1 to 3), hyaluronic acid (having a carboxyl content of about 11%, which is estimated based on the composition of repeating units, ($C_{13}H_{20}O_9NCO_2H$)—), chondroitin sulfate (having a carboxyl content of about 9.8%, which is estimated based on the composition of repeating units, —($C_{12}H_{18}O_{13}NS CO_2H$)—), or combinations thereof.

Another preferred class of hydrophilicity-enhancing agents include without limitation: poly(ethylene glycol) (PEG) with mono-amino (primary or secondary amino), carboxyl or thiol group (e.g., PEG-NH$_2$, PEG-SH, PEG-COOH); H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino (primary or secondary), carboxyl or thiol groups; PEG dendrimers with one or more amino (primary or secondary), carboxyl or thiol groups; a diamino-(primary or secondary) or dicarboxyl-terminated homo- or co-polymer of a non-reactive hydrophilic vinylic monomer; a monoamino- (primary or secondary) or monocarboxyl-terminated homo- or co-polymer of a non-reactive hydrophilic vinylic monomer or a phosphorylcholine-containing vinylic monomer; a copolymer which is a polymerization product of a composition comprising (1) about 60% by weight or less, preferably from about 0.1% to about 30%, more preferably from about 0.5% to about 20%, even more preferably from about 1% to about 15%, by weight of one or more reactive vinylic monomers and (2) at least one non-reactive hydrophilic vinylic monomer; and combinations thereof.

In accordance with the invention, reactive vinylic monomers can be carboxyl-containing vinylic monomers, primary amino-containing vinylic monomers, or secondary amino-containing vinylic monomers.

Examples of preferred carboxyl-containing vinylic monomers include without limitation acrylic acid, C$_1$-C$_4$ alkylacrylic acid (e.g., methacrylic ethylacrylic acid, propylacrylic acid, butylacrylic acid), N,N-2-acrylamidoglycolic acid, beta methyl-acrylic acid (crotonic acid), alpha-phenyl acrylic acid, beta-acryloxy propionic acid, sorbic acid, angelic acid, cinnamic acid, 1-carboxy-4-phenyl butadiene-1,3, itaconic acid, citraconic acid, mesaconic acid, glutaconic acid, aconitic acid, maleic acid, fumaric acid, tricarboxy ethylene, and combinations thereof.

Examples of preferred primary and secondary amino-containing vinylic monomers include without limitation amino-C$_2$-C$_6$ alkyl (meth)acrylate, C$_1$-C$_6$ alkylamino-C$_2$-C$_6$ alkyl (meth)acrylate, allylamine, vinylamine, amino-C$_2$-C$_6$ alkyl (meth)acrylamide, C$_1$-C$_6$ alkylamino-C$_2$-C$_6$ alkyl (meth)acrylamide, and combinations thereof.

In accordance with the invention, a non-reactive vinylic monomer is a vinylic monomer free of any carboxyl group, primary amino group, secondary amino group, epoxide group, isocyanate group, azlactone group, or aziridine group. Non-reactive vinylic monomers preferably are hydrophilic vinylic monomers, phosphorylcholine-containing vinylic monomers, or combinations thereof. Examples of preferred non-reactive hydrophilic vinylic monomers include without limitation (meth)acrylamide, N,N-dimethyl (meth)acrylamide, N-vinylpyrrolidone (NVP), N-vinyl formamide, N-vinyl acetamide, N-vinyl isopropylamide, N-vinyl-N-methyl acetamide, N,N-dimethylaminoethyl (meth)acrylate, N,N-dimethylaminopropyl (meth)acrylamide, glycerol (meth)acrylate, 3-(meth)acryloylamino-1-propanol, N-hydroxyethyl (meth)acrylamide, N-hydroxypropyl (meth)acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, C$_1$-C$_4$-alkoxy polyethylene glycol (meth)acrylate having a weight average molecular weight of up to 1500 Daltons, allyl alcohol, vinyl alcohol, and combinations thereof.

Examples of preferred non-reactive phosphorylcholine-containing vinylic monomers include without limitation (meth)acryloyloxyethyl phosphorylcholine (aka, MPC, or 2-((meth)acryloyloxy)ethyl-2'-(triethylammonio)ethylphosphate), (meth)acryloyloxypropyl phosphorylcholine (aka, 3-((meth)acryloyloxy)propyl-2'-(trimethylammonio)ethylphosphate), 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethyammonio) ethylphosphate, 4-[(meth)acryloylamino]butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyoxy)propyl-2'-(trimethylammonio)-ethylphosphate, 2-((meth)acryloyloxy)butyl-2'-(trimethylammonio) ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio) ethylphosphate, 2-(allyloxycarbonylamino)ethyl-2-(trimethylammonio)ethyl phosphate, 2-(butenoyloxy)ethyl-2'-(trimethylammonio)ethylphosphate, those described in U.S. Pat. No. 5,461,433 (herein incorporated by reference in its entirety), and combinations thereof.

More preferably, a hydrophilicity-enhancing agent is PEG-NH$_2$; PEG-SH; PEG-COOH; H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino, carboxyl or thiol groups; PEG dendrimers with one or more amino, carboxyl or thiol groups; a monoamino-, monocarboxyl-, diamino- or dicarboxyl-terminated homoor copolymer of a non-reactive hydrophilic vinylic monomer selected from the group consisting of (meth)acrylamide, N-vinylpyrrolidone (NVP), N-vinyl-N-methyl acetamide, glycerol (meth)acrylate, hydroxyethyl (meth)acrylate, N-hydroxyethyl (meth)acrylamide, N-hydroxypropyl (meth) acrylamide, $C_1$-$C_4$-alkoxy polyethylene glycol (meth)acrylate having a weight average molecular weight of up to 400 Daltons, vinyl alcohol, N-methyl-3-methylene-2-pyrrolidone, 1-methyl-5-methylene-2-pyrrolidone, 5-methyl-3-methylene-2-pyrrolidone, N,N-dimethylaminoethyl (meth) acrylate, N,N-dimethylaminopropyl (metha)crylamide, a phosphorylcholine-containing vinylic monomer, and combinations thereof; a copolymer which is a polymerization product of a composition comprising (1) from about 0.1% to about 30%, preferably from about 0.5% to about 20%, more preferably from about 1% to about 15%, by weight of acrylic acid, $C_1$-$C_3$ alkylacrylic acid, allylamine and/or amino-$C_2$-$C_4$ alkyl (meth)acrylate, and (2) at least one non-reactive hydrophilic vinylic monomer selected from the group consisting of acrylamide, N,N-dimethylacrylamide, N-vinylpyrrolidone, a phosphorylcholine-containing vinylic monomer, N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, and combination thereof.

Most preferably, a hydrophilicity-enhancing agent is PEG-N $H_2$; PEG-SH; PEG-OOOH; monoamino-, monocarboxyl-, diamino- or dicarboxyl-terminated polyvinylpyrrolidone; monoamino-, monocarboxyl-, diamino- or dicarboxyl-terminated polyacrylamide; monoamino-, monocarboxyl-, diamino- or dicarboxyl-terminated poly(DMA); monoamino- or monocarboxyl-, diamino- or dicarboxyl-terminated poly(DMA-co-NVP); monoamino-, monocarboxyl-, diamino- or dicarboxyl-terminated poly(NVP-co-N,N-dimethylaminoethyl (meth)acrylate)); monoamino-, monocarboxyl-, diamino- or dicarboxyl-terminated poly(vinylalcohol); monoamino-, monocarboxyl-, diamino- or dicarboxyl-terminated poly[(meth)acryloyloxyethyl phosphrylcholine] homopolymer or copolymer; monoamino-, monocarboxyl-, diamino- or dicarboxyl-terminated poly(NVP-co-vinyl alcohol); monoamino-, monocarboxyl-, diamino- or dicarboxyl-terminated poly(N,N-dimethylacrylamide-co-vinyl alcohol); poly[(meth)acrylic acid-co-acrylamide] with from about 0.1% to about 30%, preferably from about 0.5% to about 20%, more preferably from about 1% to about 15%, by weight of (meth)acrylic acid; poly[(meth)acrylic acid-co-NVP] with from about 0.1% to about 30%, preferably from about 0.5% to about 20%, more preferably from about 1% to about 15%, by weight of (meth)acrylic acid; a copolymer which is a polymerization product of a composition comprising (1) a phosphorylcholine-containing vinylic monomer, and (2) from about 0.1% to about 30%, preferably from about 0.5% to about 20%, more preferably from about 1% to about 15%, by weight of acrylic acid, $C_1$-$C_3$ alkylacrylic acid, allylamine and/or amino-$C_2$-$C_4$alkyl (meth)acrylate; and combination thereof.

PEGs with functional groups and multi-arm PEGs with functional groups can be obtained from various commercial suppliers, e.g., Polyscience, and Shearwater Polymers, inc., etc.

Monoamino-, monocarboxyl-, diamino- or dicarboxyl-terminated homo- or copolymers of one or more non-reactive hydrophilic vinylic monomers or of a phosphorylcholine-containing vinylic monomer can be prepared according to procedures described in U.S. Pat. No. 6,218,508, herein incorporated by reference in its entirety. For example, to prepare a diamino- or dicarboxyl-terminated homo- or co-polymer of a non-reactive hydrophilic vinylic monomer, the non-reactive vinylic monomer, a chain transfer agent with a primary or secondary amino or carboxyl group (e.g., 2-aminoethanethiol, 2-mercaptoprpinic acid, thioglycolic acid, thiolactic acid, or other hydroxymercaptanes, aminomercaptans, or carboxyl-containing mercaptanes) and optionally other vinylic monomer are copolymerized (thermally or actinically) with a reactive vinylic monomer (having a primary or secondary amino or carboxyl group), in the presence of an free-radical initiator. Generally, the molar ratio of chain transfer agent to that of all of vinylic monomers other than the reactive vinylic monomer is from about 1:5 to about 1:100, whereas the molar ratio of chain transfer agent to the reactive vinylic monomer is 1:1. In such preparation, the chain transfer agent with primary or secondary amino or carboxyl group is used to control the molecular weight of the resultant hydrophilic polymer and forms a terminal end of the resultant hydrophilic polymer so as to provide the resultant hydrophilic polymer with one terminal primary or secondary amino or carboxyl group, while the reactive vinylic monomer provides the other terminal carboxyl or primary or secondary amino group to the resultant hydrophilic polymer. Similarly, to prepare a monoamino- or monocarboxyl-terminated homo- or co-polymer of a non-reactive hydrophilic vinylic monomer, the non-reactive vinylic monomer, a chain transfer agent with a primary or secondary amino or carboxyl group (e.g., 2-aminoethanethiol, 2-mercaptoprpinic acid, thioglycolic acid, thiolactic acid, or other hydroxymercaptanes, aminomercaptans, or carboxyl-containing mercaptanes) and optionally other vinylic monomers are copolymerized (thermally or actinically) in the absence of any reactive vinylic monomer.

Copolymers comprising a non-reactive hydrophilic vinylic monomer and a reactive vinylic monomer (e.g., a carboxyl-containing vinylic monomer, a primary amino group-containing vinylic monomer or a secondary amino group-containing vinylic monomer) can be prepared according to any well-known radical polymerization methods or obtained from commercial suppliers. Copolymers containing methacryloyloxyethyl phosphorylcholine and carboxyl-containing vinylic monomer (or amino-containing vinylic monomer) can be obtained from NOF Corporation (e.g., LIPIDURE®-A and -AF).

The weight average molecular weight $M_w$ of the hydrophilic polymer having at least one amino, carboxyl or thiol group (as a hydrophilicity-enhancing agent) is preferably from about 500 to about 5,000,000, more preferably from about 1,000 to about 2,000,000, even more preferably from about 5,000 to about 1,000,000 Daltons.

Water-soluble and thermally-crosslinkable hydrophilic polymeric materials can be prepared according to the processes disclosed in U.S. Pat. Appli. Pub. Nos. US 2016/0061995 A1 and US2013/0337160 A1 (herein incorporated by reference in their entireties) and in U.S. Pat. No. 8,529,057 (herein incorporated by reference in its entirety).

In a preferred embodiment, a water-soluble thermally-crosslinkable polymeric material can be obtained by heating an aqueous reactive solution, which comprises at least one azetidinium-containing polymer and at least one hydrophilicity-enhancing agent (i.e., a wetting agent) having at least one reactive functional group selected from the group consisting of primary amino group, secondary amino group, carboxyl group, thiol group, and a combination thereof, to a temperature of from about 35° C. to about 85° C. and maintaining the temperature for a period of time sufficient (about 6 hours or less, preferably about 5 hours, more preferably from about 2 hour to about 4 hours). The aqueous reactive solution preferably comprises from about 70 mM to about 170 mM (preferably about 90 mM to about 150 mM, more preferably from about 100 mM to about 130 mM) of one or more ionic compounds and a pH of at least 8.0 (preferably at least 8.5, more preferably at least 9.0, even more preferably at least 9.5). It should be understood that the reaction time should be long enough to covalently attach the hydrophilicity-enhancing agent onto the polymer chain of the azetidinium-containing polymer, but should be short enough not to consume all the azetidinium groups of the azetidinium-containing polymer and not to form a gel (i.e., not water-soluble) due to the too many crosslinkages formed between the azetidinium-containing polymer and the hydrophilicity-enhancing agent. A resultant polymeric material is a lightly-crosslinked polymeric material which has a highly-branched structure and still comprises thermally-crosslinkable azetidinium groups.

A person skilled in the art understands well how to adjust the pH of the reactive mixture, e.g., by adding a base (e.g., NaOH, KOH, NH$_4$OH, or mixture thereof) or an acid (e.g., HCl, H$_2$SO$_4$, H$_3$PO$_4$, citric acid, acetic acid, boric acid, or mixture thereof).

In accordance with the invention, any ionic compounds can be used in the reactive mixture. Preferably, ionic compounds are those used as ionic tonicity-adjusting agents and ionic buffering agents used in an ophthalmic solutions. Examples of preferred ionic tonicity-adjusting agents includes without limitation sodium chloride, potassium chloride, and combinations thereof. Examples of preferred ionic buffering agents includes various salts of phosphoric acid (e.g. NaH$_2$PO$_4$, Na$_2$HPO$_4$, Na$_3$PO$_4$, KH$_2$PO$_4$, K$_2$HPO$_4$, K$_3$PO$_4$, or mixtures thereof), various salts of boric acid (e.g., sodium borate, potassium borate, or mixture thereof), various salts of citric acid (e.g., monosodium citrate, disodium citrate, trisodium citrate, monopotassium citrate, dipotassium citrate, tripotassium citrate, or mixtures thereof), various salts of carbonic acid (e.g., Na$_2$CO$_3$, NaHCO$_3$, K$_2$CO$_3$, KHCO$_3$, or mixture thereof).

The aqueous reactive solution for preparing a water-soluble thermally-crosslinkable polymeric material can be prepared by dissolving a desired amount of an azetidinium-containing polymer, a desired amount of a hydrophilicity-enhancing agent with at least one reactive functional group, and desired amounts of other components (e.g., ionic buffering agents, ionic tonicity-adjusting agents, etc.) in water (or a mixture of water and a minority amount of a water-soluble organic solvent) to form an aqueous solution and then adjusting the pH of the aqueous solution if necessary.

In accordance with the invention, the concentration ratio of a hydrophilicity-enhancing agent relative to an azetidinium-containing polymer in the aqueous reactive solution must be selected not to render a resultant water-soluble thermally-crosslinkable polymeric material water-insoluble (i.e., a solubility of less than 0.005 g per 100 ml of water at room temperature) and not to consume more than about 99%, preferably about 98%, more preferably about 97%, even more preferably about 96% of the azetidinium groups of the azetidinium-containing polymer.

In a preferred embodiment, the aqueous reactive solution comprises from 0.01% to about 10% by weight (preferably from 0.05% to about 5% by weight, more preferably from 0.08% to about 1% by weight, even more preferably from 0.1% to about 0.4% by weight) of an azetidinium-containing polymer and from about 0.01% to about 10% by weight (preferably from 0.02% to about 5% by weight, more preferably from 0.05% to about 2% by weight, even more preferably from 0.08% to about 1.0% by weight) of a hydrophilicity-enhancing agent having at least one reactive function group (carboxyl, primary amino, secondary amino group), the concentration ratio of the azetidinium-containing polymer to the hydrophilicity-enhancing agent is from about 1000:1 to 1:1000 (preferably from about 500:1 to about 1:500, more preferably from about 250:1 to about 1:250, even more preferably from about 100:1 to about 1:100).

In a preferred embodiment, the water-soluble thermally-crosslinkable polymeric material comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties or second polymer chains derived from at least one hydrophilicity-enhancing agent having at least one reactive functional group selected from the group consisting of primary amino group, secondary amino group, carboxyl group, thiol group, and combination thereof (preferably carboxyl groups), wherein the hydrophilic moieties or second polymer chains are covalently attached to the first polymer chains through one or more covalent linkages each formed between one azetidinium group of the polyamidoamine-epichlorohydrin or the poly(2-oxazoline-co-ethyleneimine)-epichlorohydrin and one amino, carboxyl or thiol group of the hydrophilicity-enhancing agent, and (iii) azetidinium groups which are parts of the first polymer chains or pendant or terminal groups covalently attached to the first polymer chains. The composition of the water-soluble thermally-crosslinkable polymeric material is determined by the composition (based on the total weight of the reactants) of a reactant mixture used for such a polymer according to the crosslinking reactions shown in Scheme I above. For example, if a reactant mixture comprises about 75% by weight of a polyamidoamine-epichlorohydrin and about 25% by weight of at least one hydrophilicity-enhancing agent based on the total weight of the reactants (excluding solvent), then the resultant chemically-modified polyamidoamine-epichlorohydrin comprises about 75% by weight of first polymer chains derived from the polyamioamine-epichlorohydrin and about 25% by weight of hydrophilic moieties or second polymer chains derived from said at least one hydrophilicity-enhancing agent.

Preferably, the step of heating is performed by autoclaving the soft contact lens precursor in the second aqueous coating solution which is a packaging solution (i.e., a buffered aqueous solution with a pH of from 6.7 to 7.6) in a sealed lens package at a temperature of from about 115° C. to about 125° C. for approximately 20-90 minutes. It is believed that during autoclave those azetidinium groups which do not participate in crosslinking reaction may be hydrolyzed into 2,3-dihydroxypropyl (HO—CH$_2$—CH(OH)—CH$_2$—) groups and that the azetidinium-containing polymeric material present in the lens packaging solution, if applicable, can be converted to a non-reactive polymeric wetting agent capable of improving a lens's insert comfort. Consequently, the second aqueous coating solution is ophthalmically safe after autoclave.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

In accordance with the invention, a packaging solution contains at least one buffering agent and one or more other ingredients known to a person skilled in the art. Examples of other ingredients include without limitation, tonicity agents, surfactants, antibacterial agents, preservatives, and lubricants (e.g., cellulose derivatives, polyvinyl alcohol, polyvinyl pyrrolidone).

The packaging solution contains a buffering agent in an amount sufficient to maintain a pH of the packaging solution in the desired range, for example, preferably in a physiologically acceptable range of about 6.5 to about 7.5. Any known, physiologically compatible buffering agents can be used. Suitable buffering agents as a constituent of the contact lens care composition according to the invention are known to the person skilled in the art. Examples are boric acid, borates, e.g. sodium borate, citric acid, citrates, e.g. potassium citrate, bicarbonates, e.g. sodium bicarbonate, TRIS (2-amino-2-hydroxymethyl-1,3-propanediol), Bis-Tris (Bis-(2-hydroxyethyl)-imino-tris-(hydroxymethyl)-methane), bis-aminopolyols, triethanolamine, ACES (N-(2-hydroxyethyl)-2-aminoethanesulfonic acid), BES (N,N-Bis(2-hydroxyethyl)-2-aminoethanesulfonic acid), HEPES (4-(2-hydroxyethyl)-1-piperazineethanesulfonic acid), MES (2-(N-morpholino)ethanesulfonic acid), MOPS (3-[N-morpholino]-propanesulfonic acid), PIPES (piperazine-N,N'-bis(2-ethanesulfonic acid), TES (N-[Tris(hydroxymethyl)methyl]-2-aminoethanesulfonic acid), salts thereof, phosphate buffers, e.g. $Na_2HPO_4$, $NaH_2PO_4$, and $KH_2PO_4$ or mixtures thereof. Preferably, the buffering agents are phosphate buffers, borate buffers, or combinations thereof. The amount of each buffer agent in a packaging solution is preferably from 0.001% to 2%, preferably from 0.01% to 1%; most preferably from about 0.05% to about 0.30% by weight.

The packaging solution has a tonicity of from about 200 to about 450 milliosmol (mOsm), preferably from about 250 to about 350 mOsm. The tonicity of a packaging solution can be adjusted by adding organic or inorganic substances which affect the tonicity. Suitable occularly acceptable tonicity agents include, but are not limited to sodium chloride, potassium chloride, glycerol, propylene glycol, polyols, mannitols, sorbitol, xylitol and mixtures thereof.

A packaging solution of the invention has a viscosity of from about 1 centipoise to about 5 centipoises, at 25° C.

In a preferred embodiment, the packaging solution comprises preferably from about 0.01% to about 2%, more preferably from about 0.05% to about 1.5%, even more preferably from about 0.1% to about 1%, most preferably from about 0.2% to about 0.5%, by weight of a water-soluble thermally-crosslinkable hydrophilic polymeric material having azetidinium groups.

A packaging solution of the invention can contain a viscosity-enhancing polymer. The viscosity-enhancing polymer preferably is nonionic. Increasing the solution viscosity provides a film on the lens which may facilitate comfortable wearing of the contact lens. The viscosity-enhancing component may also act to cushion the impact on the eye surface during insertion and serves also to alleviate eye irritation.

Preferred viscosity-enhancing polymers include, but are not limited to, water soluble cellulose ethers (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof), water-soluble polyvinylalcohols (PVAs), high molecular weight poly(ethylene oxide) having a molecular weight greater than about 2000 (up to 10,000,000 Daltons), polyvinylpyrrolidone with a molecular weight of from about 30,000 daltons to about 1,000,000 daltons, a copolymer of N-vinylpyrrolidone and at least one dialkylaminoalkyl (meth)acrylate having 7-20 carbon atoms, and combinations thereof. Water soluble cellulose ethers and copolymers of vinylpyrrolidone and dimethylaminoethylmethacrylate are most preferred viscosity-enhancing polymers. Copolymers of N-vinylpyrrolidone and dimethylaminoethylmethacrylate are commercially available, e.g., Copolymer 845 and Copolymer 937 from ISP.

The viscosity-enhancing polymer is present in the packaging solution in an amount of from about 0.01% to about 5% by weight, preferably from about 0.05% to about 3% by weight, even more preferably from about 0.1% to about 1% by weight, based on the total amount of the packaging solution.

A packaging solution can further comprises a polyethylene glycol having a molecular weight of about 1200 or less, more preferably 600 or less, most preferably from about 100 to about 500 daltons.

Where at least one of the crosslinked coating and the packaging solution contains a polymeric material having polyethylene glycol segments, the packaging solution preferably comprises an α-oxo-multi-acid or salt thereof in an amount sufficient to have a reduced susceptibility to oxidation degradation of the polyethylene glycol segments. A commonly-owned co-pending patent application (US patent application publication No. 2004/0116564 A1, incorporated herein in its entirety) discloses that oxo-multi-acid or salt thereof can reduce the susceptibility to oxidative degradation of a PEG-containing polymeric material.

Exemplary α-oxo-multi-acids or biocompatible salts thereof include without limitation citric acid, 2-ketoglutaric acid, or malic acid or biocompatible (preferably ophthalmically compatible) salts thereof. More preferably, an α-oxo-multi-acid is citric or malic acid or biocompatible (preferably ophthalmically compatible) salts thereof (e.g., sodium, potassium, or the like).

In accordance with the invention, the packaging solution can further comprises mucin-like materials, ophthalmically beneficial materials, and/or surfactants.

Exemplary mucin-like materials include without limitation polyglycolic acid, polylactides, and the likes. A mucin-like material can be used as guest materials which can be released continuously and slowly over extended period of time to the ocular surface of the eye for treating dry eye syndrome. The mucin-like material preferably is present in effective amounts.

Exemplary ophthalmically beneficial materials include without limitation 2-pyrrolidone-5-carboxylic acid (PCA), amino acids (e.g., taurine, glycine, etc.), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Surfactants can be virtually any ocularly acceptable surfactant including non-ionic, anionic, and amphoteric surfactants. Examples of preferred surfactants include without limitation poloxamers (e.g., Pluronic® F108, F88, F68, F68LF, F127, F87, F77, P85, P75, P104, and P84), poloamines (e.g., Tetronic® 707, 1107 and 1307, polyethylene glycol esters of fatty acids (e.g., Tween® 20, Tween® 80), polyoxyethylene or polyoxypropylene ethers of $C_{12}$-$C_{18}$ alkanes (e.g., Brij® 35), polyoxyethyene stearate (Myrj®

52), polyoxyethylene propylene glycol stearate (Atlas® G 2612), and amphoteric surfactants under the trade names Mirataine® and Miranol®.

It is believed that viscosity-enhancing polymer, a polyethylene glycol, a mucin-like material, an ophthalmically beneficial material, and a surfactant present in the packaging solution can be entrapped in the polymer matrix of the hydrogel coating and then release into the eye when being worn.

A method of the invention described above is particularly suitable for producing a new class of soft contact lenses of the invention, e.g., from currently-available non-silicone hydrogel contact lenses. It is understood that a method of the invention can be modified to arrive at a different method for producing this new class of soft contact lenses.

For instance, an anchor layer of a polyanionic polymer can be substituted with a layer of a different polymer having reactive functional groups, so long as it can form a stable layer according to any method, e.g., grafting, complexation, partially entrapment (partial penetration into the lens body), or the likes, known to a person skilled in the art. As an illustrative example, a polymer having azetidinium groups and additional reactive functional groups (e.g., epoxy, aziridine, azlactone, isocyanate groups, or vinyl sulfone) can be grafted to the surface of a preformed non-silicone hydrogel contact lens according a coupling reaction between hydroxyl group and epoxy (or aziridine, or azlactone, or isocyanate, or vinyl sulfone) group, to form an anchor layer on the preformed non-silicone hydrogel contact lens. The azetidinium groups (or left-over epoxy, aziridine, azlactone, isocyanate, or vinyl sulfone groups) of the anchor layer can function as reactive sites for grafting a hydrophilic polymeric material having carboxyl, primary amino, secondary amino, or thiol groups and azetidinium (or aziridine, or azlactone, or isocyanate, or vinyl sulfone) groups to form a hydrogel coating through intermolecular and intramolecular linkages.

Alternatively, where a preformed non-silicone hydrogel contact lens comprises monomeric units having a carboxyl, primary amino, or secondary amino groups, a polymer having azetidinium, epoxy, aziridine, azlactone, or isocyanate groups can be grafted to the surface of such a preformed non-silicone hydrogel contact lens according a coupling reaction between carboxyl group (or primary amino group, or secondary amino group) and azetidinium group (or epoxy, or aziridine, or azlactone, or isocyanate) group, to form an anchor layer on the preformed non-silicone hydrogel contact lens. The azetidinium groups (or left-over epoxy, aziridine, azlactone, isocyanate, or vinyl sulfone groups) of the anchor layer can function as reactive sites for grafting a hydrophilic polymeric material having carboxyl, primary amino, secondary amino, or thiol groups and azetidinium (or aziridine, or azlactone, or isocyanate, or vinyl sulfone) groups to form a hydrogel coating through intermolecular and intramolecular linkages.

A person skilled in the art knows a coupling reaction involving a hydroxyl group, a carboxyl group, a primary amino group, or a secondary amino group. For example, a hydroxyl reacts with an isocyanate to form a urethane linkage; a hydroxyl reacts with an epoxy or aziridine to form an ether linkage (—O—); an hydroxyl group reacts with an azlactone group in the presence of a catalyst to form an amidoalkylenecarboxy linkage (—C(O)NH-alkylene-C(O)—O—); an hydroxyl group reacts with a vinyl sulfone at a relatively high pH (e.g., pH~9 to 10) to form a linkage of

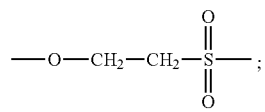

an amino group —NHR° reacts (ring-opening) with an azlactone group to form an alkylene-diamido linkage (—C(O)NH-alkylene-C(O)NR°— with R° as defined above); an amino group —NHR° reacts with an isocyanate group to form a urea linkage (—NR°—C(O)—NH— with R° as defined above); an amino group —NHR° reacts with an epoxy or aziridine group to form an amine bond (—C—NR°— with R° as defined above); a carboxyl group reacts with an epoxy group to form an ester bond; an azetidinium group

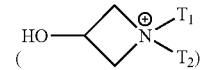

reacts with an amino group (—NHR° or a carboxyl group to form a linkage (T₁T₂N-CH2-CH(OH)—CH₂-E- with E=NR°, COO, or O) at an temperature of from about 40° C. to 140° C.

In another aspect, the invention provides a soft contact lens which comprises: a non-silicone hydrogel lens body; and a hydrogel coating thereon, wherein the non-silicone hydrogel lens body is composed of a hydrogel material which is free of silicone and comprises at least 50% by mole of repeating units of at least one hydroxyl-containing vinylic monomer, wherein the coating comprises an anchoring layer of a first polymeric material having first reactive functional groups and a hydrogel layer derived from a second polymeric material having second reactive functional groups, wherein the hydrogel layer is covalently attached onto the anchor layer through linkages each formed between one first reactive functional group and one second reactive functional group, wherein the hydrogel coating has a thickness of about 0.1 μm to about 20 μm (preferably from about 0.25 μm to about 17 μm, more preferably from about 0.5 μm to about 15 μm, even more preferably from about 1 μm to about 10 μm), wherein the soft contact lens has a surface lubricity better than the lubricity of the non-silicone hydrogel lens body and has a friction rating of about 2 or lower (preferably about 1.5 or lower, more preferably about 1.0 or lower, even more preferably about 0.5 or lower) after 7 cycles of manual rubbing, a water content of from about 10% to about 85% by weight (preferably from about 15% to about 80%, more preferably from about 30% to about 75% by weight) and an elastic modulus of from about 0.2 MPa to about 1.5 MPa (preferably from about 0.3 MPa to about 1.2 MPa, more preferably from about 0.4 MPa to about 1.0 MPa) when being fully hydrated at room temperature (i.e., a temperature of about 22° C. to 28° C.).

A person skilled in the art knows well how to determine the water content and elastic modulus of a contact lens. All commercial hydrogel contact lenses have those two lens properties in their packages.

In accordance with the invention, the first and second reactive functional groups are different and co-reactive with each other and are selected from one of the group consisting of carboxyl groups, primary amino groups, secondary amino groups, thiol groups, azetidinium groups, epoxy groups, aziridine groups, azlactone groups, isocyanate groups, vinyl sulfone groups, and combinations thereof. If the first reactive functional groups are carboxyl groups, primary amino groups, secondary amino groups, thiol groups or combinations thereof, then the second reactive functional groups are azetidinium groups, epoxy groups, aziridine groups, azlactone groups, isocyanate groups, vinyl sulfone groups, or combinations thereof. If the first reactive functional groups are azetidinium groups, epoxy groups, aziridine groups, azlactone groups, isocyanate groups, vinyl sulfone groups, or combinations thereof, then the second reactive functional groups are carboxyl groups, primary amino groups, secondary amino groups, thiol groups or combinations thereof.

Besides those coupling reactions described above, a person skilled in the art knows a coupling reaction involving a thiol group. For example, a thiol group (—SH) reacts with an isocyanate to form a thiocarbamate linkage (—N—C(O)—S—); a thiol group reacts with an epoxy or aziridine to form a thioether linkage (—S—); a thiol group reacts with an acid chloride or bromide group or with an acid anhydride group to form a thioester linkage; a thiol group reacts with an azlactone group in the presence of a catalyst to form a linkage (—C(O)NH—CR$_{12}$R$_{12}$'—(CH$_2$)p-C(O)—S—); a thiol group reacts with a vinyl group based on thiol-ene reaction under thiol-ene reaction conditions to form a thioether linkage (—S—); a thiol group reacts with a vinyl sulphone based on Michael Addition under appropriate reaction conditions to form a linkage of

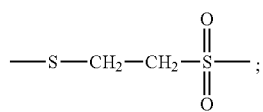

a thiol group reacts with an azetidinium group

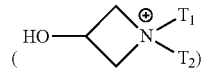

to form a linkage (T$_1$T$_2$N-CH2-CH(OH)—CH$_2$—S—) at an temperature of from about 40° C. to 140° C.

A non-silicone hydrogel lens body has a 3-dimensional shape of a contact lens. In accordance with the invention, a preformed non-silicone hydrogel contact lens becomes a non-silicone hydrogel lens body after being subjected to a surface treatment (here a coating process described above).

In a preferred embodiment, the hydrogel material (of the non-silicone hydrogel contact lens body) comprises at least 50% by moles of repeating units of at least one hydroxyl-containing vinylic monomer selected from the group consisting of hydroxyethyl (meth)acrylate, 2-hydroxypropyl (meth)acrylate, 3-hydroxypropyl (meth)acrylate, glycerol (meth)acrylate, N-2-hydroxyethyl (meth)acrylamide, N-2-hydroxypropyl (meth)acrylamide, N-3-hydroxypropyl (meth)acrylamide, N,N-bis(hydroxyethyl) (meth)acrylamide, N-2,3-dihydroxypropyl (meth)acrylamide, N-tris(hydroxymethyl)methyl (meth)acrylamide, vinyl alcohol, allyl alcohol, and combinations thereof. Preferably, the hydrogel material further comprises repeating units of at least one amide-containing vinylic monomer, repeating units of at least one carboxyl-containing acrylic monomer (e.g., any one described above), or repeating units of at least one acrylic monomer having a primary or secondary amino group (e.g., any one described above). It is believed that the amide group in an amide-containing vinylic monomer can form hydrogen bonds with carboxyl groups of a polyanionic polymer to facilitate the formation of the anchor layer of the polyanionic polymer, the carboxyl or primary or secondary amino groups in an acrylic monomer can serve as reactive sites on or near the surface of the lens body for grafting a polymeric material to the lens body to form the anchor layer.

In a preferred embodiment, the non-silicone hydrogel contact lens body is a polyvinylalcohol-based hydrogel contact lens body. Preferably, the polyvinylalcohol-based hydrogel contact lens body is a crosslinked product of a water-soluble, actinically-crosslinkable polyvinyl alcohol prepolymer described above.

Preferably, the non-silicone hydrogel contact lens body comprises a polymer matrix, a first leachable polymeric lubricant, and a second leachable polymeric lubricant, wherein the first and second leachable polymeric lubricants are not covalently attached to the polymer matrix but are distributed within the polymer matrix, wherein the second leachable polymeric lubricant has an average molecular weight being at least about 3 fold of the average molecular weight of the first leachable polymeric lubricant.

In a preferred embodiment, the first polymeric material comprises epoxy groups, aziridine groups, azlactone groups, isocyanate groups, vinyl sulfone groups, or a combination thereof; and the first polymeric material is grafted to the non-silicone hydrogel lens body to form the anchor layer. It is understood that the first polymeric material with those listed reactive functional groups can be grafted to the lens body according to coupling reaction between one hydroxyl group and one epoxy (or aziridine, or azlactone, or isocyanate, or vinyl sulfone) group and optionally according to coupling reaction between one carboxyl (or primary amino, or secondary amino) group and one epoxy (or aziridine, or azlactone, or isocyanate, or vinyl sulfone) group.

In accordance with the invention, the thickness of a hydrogel coating on a soft contact lens of the invention refers to an averages thickness and can be measured with AFM on a cross section of the contact lens in fully hydrated state (i.e., in a phosphate buffered solution, pH~7.3±0.2).

In a preferred embodiment, the hydrogel coating has a water-swelling ratio of at least 150% (preferably at least 175%, more preferably at least 200%, even more preferably at least 250%, most preferably at least 300%).

As used in this application, the term "water-swelling ratio," in reference to the hydrogel coating of a soft contact lens of the invention, means a value determined with AFM according $$WSR = \frac{L_{Wet}}{L_{Dry}} \times 100\%$$

to in which WSR is the water-swelling ratio of the hydrogel coating, $L_{Wet}$ is the average thickness of the hydrogel coating of the soft contact lens in fully hydrated state as measured with AFM on a cross section of the contact lens in fully hydrated state (i.e., in a phosphate buffered solution, pH~7.3±0.2), and $L_{Dry}$ is the average thickness of the hydrogel coating of the soft contact lens in dry state as measured with AFM on a cross section of the contact lens in dry state (dried in the air) and in substantially dry atmosphere.

It is believed that a water-swelling ratio of the hydrogel coating (of a soft contact lens of the invention) is proportional to the equilibrium water content (i.e., a water content when being fully hydrated) possessed by the hydrogel coating. The higher a water-swelling ratio of the hydrogel coating is, the higher the equilibrium water content of the hydrogel coating is. Furthermore, it is believed that a water-swelling ratio of the hydrogel coating (of a soft contact lens of the invention) is proportional to the mesh size of the hydrogel coating and thereby is proportional to the softness (i.e., surface elastic modulus) of the hydrogel coating. The mesh size of a hydrogel coating is inversely proportional to the crosslinking density of the hydrogel while being proportional to the lengths of crosslinking chains. The higher a water-swelling ratio of the hydrogel coating, the softer the hydrogel coating is (or the lower the surface elastic modulus of the hydrogel coating is). Therefore, a water swelling ratio can be a good indicator for both equilibrium water content and softness of the hydrogel coating. With high water content and high softness, such as hydrogel coating can provide superior wearing comfort to a soft contact lens.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A method for producing soft contact lenses, comprising the steps of:
(1) obtaining a preformed non-silicone hydrogel contact lens, wherein the preformed non-silicone hydrogel contact lens is composed of a hydrogel material comprising at least 50% by mole of repeating units of at least one hydroxyl-containing vinylic monomer;
(2) contacting the preformed hydrogel contact lens with a first aqueous coating solution of a polyanionic polymer at a pH of about 4.0 or less and at a coating temperature of from about 25° C. to about 80° C. to obtain a soft contact lens precursor which is the preformed non-silicone hydrogel contact lens having a layer of the polyanionic polymer thereon, wherein the polyanionic polymer is a homo- or copolymers of acrylic acid, methacrylic acid, ethylacrylic acid, 2-acrylamidoglycolic acid, or 2-methacrylamidoglycolic acid; and
(3) heating the soft contact lens precursor obtained in step (2), in a second aqueous coating solution which comprises a water-soluble and thermally-crosslinkable hydrophilic polymeric material having azetidinium groups, at a temperature of from about 60° C. to about 140° C. for at least 30 minutes to crosslink the water-soluble thermally-crosslinkable hydrophilic polymeric material and the polyanionic polymer so as to form the soft contact lens with a hydrogel coating which is covalently attached onto the layer of the polyanionic polymer,
wherein the soft contact lens in fully hydrated state has a friction rating of about 2 or lower after 7 cycles of manual rubbing, provided that the elastic modulus of the soft contact lens is equal to the elastic modulus of the preformed non-silicone hydrogel contact lens within a margin of about ±10% or less.

2. The method of invention 1, wherein the first aqueous coating solution has a pH of about 3.5 or less.
3. The method of invention 1, wherein the first aqueous coating solution has a pH of about 3.0 or less.
4. The method of invention 1, wherein the first aqueous coating solution has a pH of from about 0.5 to about 2.5.
5. The method of any one of inventions 1 to 4, wherein the coating temperature is from about 30° C. to about 75° C.
6. The method of any one of inventions 1 to 4, wherein the coating temperature is from about 35° C. to about 70° C.
7. The method of any one of inventions 1 to 4, wherein the coating temperature is from about 40° C. to about 60° C.
8. The method of any one of inventions 1 to 7, wherein the preformed non-silicone hydrogel contact lens is in contact with the first aqueous coating solution for a contacting time of at least one minute.
9. The method of any one of inventions 1 to 7, wherein the preformed non-silicone hydrogel contact lens is in contact with the first aqueous coating solution for a contacting time of at least 5 minutes.
10. The method of any one of inventions 1 to 7, wherein the preformed non-silicone hydrogel contact lens is in contact with the first aqueous coating solution for a contacting time of at least 10 minutes.
11. The method of any one of inventions 1 to 7, wherein the preformed non-silicone hydrogel contact lens is in contact with the first aqueous coating solution for a contacting time of at least 30 minutes.
12. The method of any one of inventions 1 to 11, wherein the step of heating is performed by autoclaving the soft contact lens precursor immersed in the second aqueous coating solution in a sealed lens package at a temperature of from about 115° C. to about 125° C. for about 30 minutes to about 90 minutes, wherein the second aqueous coating solution is a buffered aqueous solution with a pH of from 6.7 to 7.6.
13. The method of any one of inventions 1 to 12, wherein the soft contact lens in fully hydrated state has a friction rating of about 1.5 or lower after 7 cycles of manual rubbing.
14. The method of any one of inventions 1 to 12, wherein the soft contact lens in fully hydrated state has a friction rating of about 1.0 or lower after 7 cycles of manual rubbing.
15. The method of any one of inventions 1 to 12, wherein the soft contact lens in fully hydrated state has a friction rating of about 0.5 or lower after 7 cycles of manual rubbing.
16. The method of any one of inventions 1 to 15, wherein the elastic modulus of the soft contact lens is equal to the elastic modulus of the preformed non-silicone hydrogel contact lens within a margin of about ±8% or less.
17. The method of any one of inventions 1 to 15, wherein the elastic modulus of the soft contact lens is equal to the elastic modulus of the preformed non-silicone hydrogel contact lens within a margin of about ±6% or less.
18. A soft contact lens, comprising: a non-silicone hydrogel lens body; and a hydrogel coating thereon, wherein the non-silicone hydrogel lens body is composed of a hydrogel material which is free of silicone and comprises at least 50% by mole of repeating units of at least one hydroxyl-containing vinylic monomer, wherein the hydrogel coating comprises an anchoring layer of a first polymeric material having first reactive functional groups and a hydrogel layer derived from a second polymeric material having second reactive functional groups, wherein the hydrogel layer is covalently attached onto the anchor layer through linkages each formed between one first reactive functional group and one second reactive functional group, wherein the soft contact lens has a surface lubricity better than the lubricity of the non-silicone hydrogel lens body and has a friction rating of about 2 or lower after 7 cycles of manual rubbing, a water content of from about 10% to about 85% by weight and an elastic modulus of from about 0.2 MPa to about 1.5 MPa when being fully hydrated at room temperature (i.e., a temperature of about 22° C. to 28° C.).

19. The soft contact lens of invention 18, wherein the hydrogel coating has a thickness of about 0.1 µm to about 20 µm.

20. The soft contact lens of invention 18 or 19, wherein the first and second reactive functional groups are different from each other and co-reactive with each other and are selected from the group consisting of carboxyl groups, primary amino groups, secondary amino groups, thiol groups, azetidinium groups, epoxy groups, azlactone groups, aziridine groups, isocyanate groups, vinyl sulfone groups, and combinations thereof.

21. The soft contact lens of invention 20, wherein the first reactive functional groups are carboxyl groups, primary amino groups, secondary amino groups, thiol groups, or combinations thereof, whereas the second reactive functional groups are azetidinium groups, epoxy groups, aziridine groups, azlactone groups, isocyanate groups, vinyl sulfone groups, or combinations thereof.

22. The soft contact lens of invention 20, wherein the first reactive functional groups are azetidinium groups, epoxy groups, aziridine groups, azlactone groups, isocyanate groups, vinyl sulfone groups, or combinations thereof, whereas the second reactive functional groups are carboxyl groups, primary amino groups, secondary amino groups, thiol groups, or combinations thereof.

23. The soft contact lens of any one of inventions 18 to 21, wherein the first reactive functional groups are carboxyl groups and the second reactive functional groups are azetidinium groups 24. The soft contact lens of any one of inventions 18 to 23, wherein the first polymeric material is a polyanionic polymer which is a homo- or co-polymer of at least one carboxyl-containing acrylic monomer selected from the group consisting of acrylic acid, methacrylic acid, ethylacrylic acid, 2-(meth)acrylamidoglycolic acid, and combinations thereof.

25. The soft contact lens of invention 24, wherein the hydrogel layer is covalently attached onto the anchoring layer of the polyanionic polymer through linkages each formed between one carboxyl group and one azetidinium group.

26. The soft contact lens of any one of inventions 18 to 22, wherein the first polymeric material comprises epoxy groups and is grafted to the non-silicone hydrogel lens body to form the anchor layer.

27. The soft contact lens of any one of inventions 18 to 22, wherein the first polymeric material comprises aziridine groups and is grafted to the non-silicone hydrogel lens body to form the anchor layer.

28. The soft contact lens of any one of inventions 18 to 22, wherein the first polymeric material comprises azlactone groups and is grafted to the non-silicone hydrogel lens body to form the anchor layer.

29. The soft contact lens of any one of inventions 18 to 22, wherein the first polymeric material comprises isocyanate groups and is grafted to the non-silicone hydrogel lens body to form the anchor layer.

30. The soft contact lens of any one of inventions 18 to 22, wherein the first polymeric material comprises vinyl sulfone groups and is grafted to the non-silicone hydrogel lens body to form the anchor layer.

31. The soft contact lens of any one of inventions 18 to 30, wherein the second polymeric material is a water-soluble hydrophilic polymeric material comprising the second reactive functional groups selected from the group consisting of azetidinium groups, carboxyl groups, primary amino groups, secondary amino groups, thiol groups, and combinations thereof.

32. The soft contact lens of any one of inventions 18 to 31, wherein the soft contact lens has a water content of from about 15% to about 80% by weight at room temperature (i.e., about 22° C. to 28° C.) when being fully hydrated.

33. The soft contact lens of any one of inventions 18 to 31, wherein the soft contact lens has a water content of from about 30% to about 75% by weight at room temperature (i.e., about 22° C. to 28° C.) when being fully hydrated.

34. The soft contact lens of any one of inventions 18 to 33, wherein the soft contact lens has an elastic modulus of from about 0.3 MPa to about 1.2 MPa when being fully hydrated.

35. The soft contact lens of any one of inventions 18 to 33, wherein the soft contact lens has an elastic modulus of from about 0.4 MPa to about 1.0 MPa when being fully hydrated.

36. The soft contact lens of any one of inventions 18 to 35, wherein the coating has a thickness of from about 0.25 µm to about 17 µm.

37. The soft contact lens of any one of inventions 18 to 35, wherein the coating has a thickness of from about 0.5 µm to about 15 µm.

38. The soft contact lens of any one of inventions 18 to 35, wherein the coating has a thickness of from about 1 µm to about 10 µm.

39. The soft contact lens of any one of inventions 18 to 38, wherein the soft contact lens has a friction rating of about 1.5 or lower after 7 cycles of manual rubbing.

40. The soft contact lens of any one of inventions 18 to 38, wherein the soft contact lens has a friction rating of about 1.0 or lower after 7 cycles of manual rubbing.

41. The soft contact lens of any one of inventions 18 to 38, wherein the soft contact lens has a friction rating of about 0.5 or lower after 7 cycles of manual rubbing.

42. The soft contact lens of any one of inventions 18 to 41, wherein the hydrogel coating has a water-swelling ratio of at least 150%.

43. The soft contact lens of any one of inventions 18 to 41, wherein the hydrogel coating has a water-swelling ratio of at least 175%.

44. The soft contact lens of any one of inventions 18 to 41, wherein the hydrogel coating has a water-swelling ratio of at least 200%.

45. The soft contact lens of any one of inventions 18 to 41, wherein the hydrogel coating has a water-swelling ratio of at least 250%.

46. The soft contact lens of any one of inventions 18 to 41, wherein the hydrogel coating has a water-swelling ratio of at least 300%.

47. The method of any one of inventions 1 to 17 or the soft contact lens of any one of inventions 18 to 46, wherein the hydrogel material is a crosslinked product of a water-soluble, actinically-crosslinkable polyvinyl alcohol prepolymer.

48. The method or the soft contact lens of invention 47, wherein the water-soluble, actinically-crosslinkable polyvinyl alcohol prepolymer which comprises:

at least 60% by mole of repeating units of vinyl alcohol (i.e., 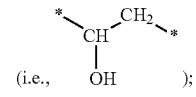 );

repeating crosslinking units of formula (I); and

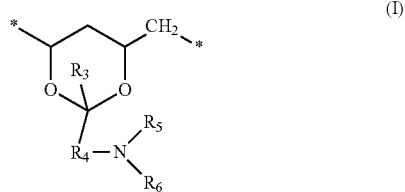

in which:
R$_3$ can be hydrogen or a C$_1$-C$_6$ alkyl group (preferably hydrogen);
R$_4$ is a C$_1$-C$_6$ alkylene divalent radical (preferably a C$_1$-C$_4$ alkylene divalent radical, more preferably methylene or butylene divalent radical, even more preferably methylene divalent radical);
R$_5$ is hydrogen or C$_1$-C$_6$ alkyl (preferably hydrogen or C$_1$-C$_4$ alkyl, more preferably hydrogen or methyl or ethyl, even more preferably hydrogen or methyl);
R$_6$ is an ethylenically unsaturated group of

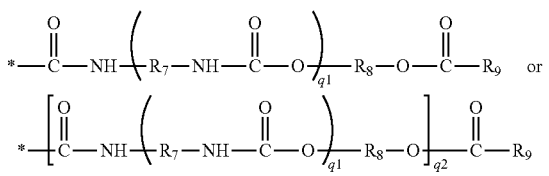

in which q1 and q2 independently of each another are zero or one, and R$_7$ and R$_8$ independently of one another are a C$_2$-C$_8$ alkylene divalent radical, R$_9$ is C$_2$-C$_8$ alkenyl.
49. The method or the soft contact lens of invention 48, wherein in formula (I) R$_3$ is hydrogen.
50. The method or the soft contact lens of invention 48 or 49, wherein in formula (I) R$_4$ is a C$_1$-C$_4$ alkylene divalent radical.
51. The method or the soft contact lens of any one of inventions 48 to 50, wherein in formula (I) R$_5$ is hydrogen or C$_1$-C$_4$ alkyl.
52. The method or the soft contact lens of any one of inventions 48 to 50, wherein in formula (I) R$_5$ is hydrogen or methyl or ethyl (preferably hydrogen or methyl).
53. The method or the soft contact lens of invention 48, wherein in formula (I) R$_4$ is methylene divalent radical, R$_5$ is hydrogen or C$_1$-C$_4$ alkyl, R$_3$ is hydrogen, and R$_6$ is a radical of

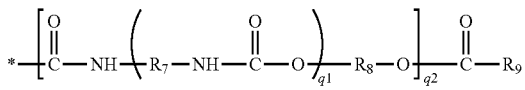

of in which q2 is zero, R$_9$ is vinyl (*—CH═CH$_2$) or 1-methylethenyl (*—C(CH$_3$)═CH$_2$).
54. The method or the soft contact lens of any one of inventions 48 to 53, wherein the polyvinylalcohol prepolymer has a weight average molecular weight of at least about 2,000 Daltons, and comprises from about 1% to about 25% by mole (preferably from about 2% to about 15% by mole) of the repeating units of formula (I).

55. The method of any one of inventions 1 to 17 or the soft contact lens of any one of inventions 18 to 46, wherein said at least one hydroxyl-containing vinylic monomer is selected from the group consisting of hydroxyethyl (meth)acrylate, 2-hydroxypropyl (meth)acrylate, 3-hydroxypropyl (meth)acrylate, glycerol (meth)acrylate, N-2-hydroxyethyl (meth)acrylamide, N-2-hydroxypropyl (meth)acrylamide, N-3-hydroxypropyl (meth)acrylamide, N,N-bis(hydroxyethyl) (meth)acrylamide, N-2,3-dihydroxypropyl (meth)acrylamide, N-tris(hydroxymethyl)methyl (meth)acrylamide, vinyl alcohol, allyl alcohol, and combinations thereof.
56. The method or the soft contact lens of invention 55, wherein the hydrogel material further comprises repeating units of at least one amide-containing vinylic monomer.
57. The method or the soft contact lens of invention 56, wherein said at least one amide-containing vinylic monomer is selected from the group consisting of (meth)acrylamide, N,N-dimethyl (meth)acrylamide, N-vinylpyrrolidone (NVP), N-vinyl formamide, N-vinyl acetamide, N-vinyl isopropylamide, N-vinyl-N-methyl acetamide, N,N-dimethylaminopropyl (meth)acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, and combinations thereof.
58. The method or the soft contact lens of any one of inventions 55 to 57, wherein the hydrogel material further comprises repeating units of at least one carboxyl-containing acrylic monomer.
59. The method or the soft contact lens of invention 58, wherein the carboxyl-containing acrylic monomer is selected from the group consisting of acrylic acid, methacrylic acid, ethylacrylic acid, 2-acrylamidoglycolic acid, 2-methacrylamidoglycolic acid, and combinations thereof.
60. The method or the soft contact lens of any one of inventions 55 to 59, wherein the hydrogel material further comprises repeating units of at least one acrylic monomers having a primary or secondary amino group.
61. The method or the soft contact lens of invention 60, wherein the acrylic monomers having a primary or secondary amino group is selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof.
62. The method of any one of inventions 1-17 and 47-61 or the soft contact lens of any one of inventions 18-61, wherein the preformed non-silicone hydrogel contact lens comprises a first leachable polymeric lubricant, and a second leachable polymeric lubricant, wherein the second leachable polymeric lubricant is different from the first leachable polymeric lubricant in molecular weight or in the polymer composition (i.e., made of different monomer units or same monomer units but different percentage)
63. The method or the soft contact lens of invention 62, wherein the second leachable polymeric lubricant has a weight average molecular weight of being at least 3 folds of the weight average molecular weight of the first leachable polymeric lubricant.

64. The method or the soft contact lens of invention 62 or 63, wherein the first and second leachable polymeric lubricants are non-crosslinkable hydrophilic polymers selected from the group consisting of: polyvinyl alcohols (PVAs); polyamides; polyimides; polylactone; a homopolymer of N-vinylpyrrolidone; a copolymer of N-vinylpyrrolidone with one or more hydrophilic vinylic comonomers; a homopolymer of (meth)acrylamide; a copolymer of (meth)acrylamide with one or more hydrophilic vinylic monomers; a homopolymer of N-vinyl-N-methyl acetamide; a copolymer of N-vinyl-N-methyl acetamide with one or more hydrophilic vinylic monomers; a homopolymer of $C_2$-$C_3$ hydroxylalkyl (meth)acrylamide; a copolymer of $C_2$-$C_3$ hydroxylalkyl (meth)acrylamide with one or more hydrophilic vinylic monomer; a copolymer of a phosphrylcholine-containing vinylic monomer with one or more hydrophilic vinylic monomers; poly(ethylene oxide) (PEO); poly(2-ethyl oxazoline); heparin polysaccharides; polysaccharides; and mixtures thereof.

65. The method or the soft contact lens of invention 62 or 63 or 64, wherein the first and second leachable polymeric lubricants are non-crosslinkable polyvinyl alcohols.

66. The method of any one of inventions 1-17 and 47-65 or the soft contact lens of any one of inventions 24-25 and 31-65, wherein the polyanionic polymer is poly(acrylic acid) (PAA), poly(methacrylic acid) (PMAA), poly(acrylic acid-co-methacrylic acid) (pAA-pMAA), poly(ethylacrylic acid) (PEAA), poly(acrylic acid-co-ethylacrylic acid) (pAA-pEAA), poly(methacrylic acid-co-ethylacrylic acid) (pMAA-pEAA), poly[2acrylamidoglycolic acid], poly[2-methacrylamidoglycolic acid], or a combination thereof.

67. The method or the soft contact lens of invention 66, wherein the polyanionic polymer is poly(acrylic acid) (PAA), poly(methacrylic acid) (PMAA), poly(acrylic acid-co-methacrylic acid) (pAA-pMAA), or a combination thereof.

68. The method or the soft contact lens of invention 66 or 67, wherein the polyanionic polymer has a weight average molecular weight of at least 100,000 Daltons.

69. The method or the soft contact lens of invention 66 or 67, wherein the polyanionic polymer has a weight average molecular weight of from 200,000 to 10,000,000 Daltons.

70. The method or the soft contact lens of invention 66 or 67, wherein the polyanionic polymer has a weight average molecular weight of from 300,000 to 5,000,000 Daltons.

71. The method or the soft contact lens of invention 66 or 67, wherein the polyanionic polymer has a weight average molecular weight of from 400,000 to 3,000,000 Daltons.

72. The method of any one of inventions 1-17 and 47-71 or the soft contact lens of any one of inventions 31-67, wherein the water-soluble thermally-crosslinkable polymeric material comprises
(i) from about 20% to about 95% by weight of first polymer chains derived from a polyamidoamine-epichlorohydrin,
(ii) from about 5% to about 80% by weight of hydrophilic moieties each derived from at least one first hydrophilicity-enhancing agent having at least one reactive functional group selected from the group consisting of primary amino group, secondary amino group, carboxyl group, thiol group, and combinations thereof, wherein the hydrophilic moieties are covalently attached to the first polymer chains through one or more covalent linkages each formed between one azetidinium group of the polyamidoamine-epichlorohydrin and one primary amino, secondary amino, carboxyl or thiol group of the first hydrophilicity-enhancing agent, and
(iii) azetidinium groups which are parts of the first polymer chains or pendant or terminal groups covalently attached to the first polymer chains.

73. The method of any one of inventions 1-17 and 47-71 or the soft contact lens of any one of inventions 31-71, wherein the water-soluble thermally-crosslinkable polymeric material comprises
(i) from about 20% to about 95% by weight of first polymer chains derived from a polyamidoamine-epichlorohydrin,
(ii) from about 5% to about 80% by weight of second polymer chains each derived from at least one second hydrophilicity-enhancing agent having at least one reactive functional group selected from the group consisting of primary amino group, secondary amino group, carboxyl group, thiol group, and combinations thereof, wherein the second polymer chains are covalently attached to the first polymer chains through one or more covalent linkages each formed between one azetidinium group of the polyamidoamine-epichlorohydrin and one primary amino, secondary amino, carboxyl or thiol group of the second hydrophilicity-enhancing agent, and
(iii) azetidinium groups which are parts of the first polymer chains or pendant or terminal groups covalently attached to the first polymer chains.

74. The method of any one of inventions 1-17 and 47-71 or the soft contact lens of any one of inventions 31-71, wherein the water-soluble thermally-crosslinkable polymeric material comprises
(i) from about 20% to about 95% by weight of first polymer chains derived from a poly(2-oxazoline-co-ethyleneimine)-epichlorohydrin,
(ii) from about 5% to about 80% by weight of hydrophilic moieties each derived from at least one first hydrophilicity-enhancing agent having at least one reactive functional group selected from the group consisting of primary amino group, secondary amino group, carboxyl group, thiol group, and combination thereof, wherein the hydrophilic moieties are covalently attached to the first polymer chains through one or more covalent linkages each formed between one azetidinium group of the poly(2-oxazoline-co-ethyleneimine)-epichlorohydrin and one primary amino, secondary amino, carboxyl or thiol group of the first hydrophilicity-enhancing agent, and
(iii) azetidinium groups which are parts of the first polymer chains or pendant or terminal groups covalently attached to the first polymer chains.

75. The method of any one of inventions 1-17 and 47-71 or the soft contact lens of any one of inventions 31-71, wherein the water-soluble thermally-crosslinkable polymeric material comprises
(i) from about 20% to about 95% by weight of first polymer chains derived from a poly(2-oxazoline-co-ethyleneimine)-epichlorohydrin,
(ii) from about 5% to about 80% by weight of second polymer chains each derived from at least one second hydrophilicity-enhancing agent having at least one reactive functional group selected from the group consisting of primary amino group, secondary amino group, carboxyl group, thiol group, and combination thereof, wherein the second polymer chains are covalently attached to the first polymer chains through one or more covalent linkages each formed between one azetitdinium group of the poly(2-oxazoline-co-ethyleneimine)-epichlorohydrin and one primary amino, secondary amino, carboxyl or thiol group of the second hydrophilicity-enhancing agent, and
(iii) azetidinium groups which are parts of the first polymer chains or pendant or terminal groups covalently attached to the first polymer chains.

76. The method or the soft contact lens of invention 72 or 74, wherein the first hydrophilicity-enhancing agent is a primary amine-containing monosaccharide, a secondary amine-containing monosaccharide, a carboxyl-containing monosaccharide, a thiol-containing monosaccharide, a primary amine-containing disaccharide, a secondary amine-containing disaccharide, a carboxyl-containing disaccharide, a thiol-containing disaccharide, a primary amine-containing oligosaccharide, a secondary amine-containing oligosaccharide, a carboxyl-containing oligosaccharide, a thiol-containing oligosaccharide, or a combination thereof.

77. The method or the soft contact lens of invention 73 or 74, wherein the second hydrophilicity-enhancing agent is: a polyethylene glycol having one sole primary or secondary amino, carboxyl or thiol group; a polyethylene glycol with two terminal primary or secondary amino, carboxyl and/or thiol groups; a multi-arm polyethylene glycol with one or more primary or secondary amino, carboxyl and/or thiol groups; a polyethylene glycol dendrimer with one or more primary or secondary amino, carboxyl and/or thiol groups.

78. The method or the soft contact lens of invention 73 or 74, wherein the second hydrophilicity-enhancing agent is a copolymer which is a polymerization product of a composition comprising (1) about 60% or less by weight of one or more reactive vinylic monomers and (2) one or more non-reactive hydrophilic vinylic monomers.

79. The method or the soft contact lens of invention 78, wherein said one or more reactive vinylic monomers are vinylic monomers having a carboxyl group.

80. The method or the soft contact lens of invention 79, wherein said one or more reactive vinylic monomers are selected from the group consisting of acrylic acid, $C_1$-$C_4$ alkylacrylic acid (e.g., methacrylic ethylacrylic acid, propylacrylic acid, butylacrylic acid), N-2-(meth)acrylamidoglycolic acid, beta methyl-acrylic acid (crotonic acid), alpha-phenyl acrylic acid, beta-acryloxy propionic acid, sorbic acid, angelic acid, cinnamic acid, 1-carboxy-4-phenyl butadiene-1,3, itaconic acid, citraconic acid, mesaconic acid, glutaconic acid, aconitic acid, maleic acid, fumaric acid, tricarboxy ethylene, and combinations thereof.

81. The method or the soft contact lens of invention 79, wherein said one or more reactive vinylic monomers are acrylic acid, methylacrylic acid, or combinations thereof.

82. The method or the soft contact lens of invention 78, wherein said one or more reactive vinylic monomers are vinylic monomers having a primary or secondary amino group.

83. The method or the soft contact lens of invention 82, wherein said one or more reactive vinylic monomers are amino-$C_2$-$C_6$ alkyl (meth)acrylate, $C_1$-$C_6$ alkylamino-$C_2$-$C_6$ alkyl (meth)acrylate, allylamine, vinylamine, amino-$C_2$-$C_6$ alkyl (meth)acrylamide, $C_1$-$C_6$ alkylamino-$C_2$-$C_6$ alkyl (meth)acrylamide, and combinations thereof.

84. The method or the soft contact lens of any one of inventions 78 to 83, wherein said one or more non-reactive vinylic monomers are selected from the group consisting of a phosphorylcholine-containing vinylic monomer, (meth) acrylamide, N,N-dimethyl (meth)acrylamide, N-vinylpyrrolidone (NVP), N-vinyl formamide, N-vinyl acetamide, N-vinyl isopropylamide, N-vinyl-N-methyl acetamide, N,N-dimethylaminoethyl (meth)acrylate, N,N-dimethylaminopropyl (meth)acrylamide, glycerol (meth)acrylate, N-2-hydroxyethyl (meth)acrylamide, N-2-hydroxypropyl (meth)acrylamide, N-3-hydroxypropyl (meth)acrylamide, N,N-bis (hydroxyethyl) (meth)acrylamide, N-2,3-dihydroxypropyl (meth)acrylamide, N-tris(hydroxymethyl)methyl (meth) acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth) acrylate having a weight average molecular weight of up to 1500 Daltons, allyl alcohol, vinyl alcohol, and combinations thereof.

85. The method or the soft contact lens of any one of inventions 78 to 83, wherein said one or more non-reactive vinylic monomers are selected from the group consisting of acrylamide, N,N-dimethylacrylamide, N-vinylpyrrolidone, a phosphorylcholine-containing vinylic monomer, N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, and combination thereof.

86. The method or the soft contact lens of any one of inventions 78 to 83, wherein said one or more non-reactive vinylic monomers are phosphorylcholine-containing vinylic monomers.

87. The method or the soft contact lens of any one of inventions 78 to 83, wherein said one or more non-reactive vinylic monomers are (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio) ethylphosphate, 4-[(meth) acryloylamino]butyl-2'-(trimethylammonio)ethylphosphate, 5-((meth)acryloyloxy)pentyl-2''-(trimethylammonio)ethyl phosphate, 6-((meth)acryloyloxy)hexyl-2''-(trimethylammonio)-ethylphosphate, 2-((meth)acryloyloxy)ethyl-2'-(triethylammonio)ethyl-phosphate, 2-((meth)acryloyloxy) ethyl-2'-(tripropylammonio)ethylphosphate, 2-((meth) acryloyloxy)ethyl-2'-(tributylammonio)ethyl phosphate, 2-((meth)acryloyloxy)propyl-2-(trimethylammonio)-ethylphosphate, 2-((meth)acryloyloxy)butyl-2'-(trimethylammonio) ethylphosphate, 2-((meth)acryloyloxy)pentyl-2'-(trimethylammonio)ethylphosphate, 2-((meth)acryloyloxy) hexyl-2'-(trimethylammonio)ethyl phosphate, 2-(vinyloxy) ethyl-2'-(trimethylammonio)ethylphosphate, 2-(allyloxy) ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)-ethylphosphate, 2-(allyloxycarbonylamino)ethyl-2'-(trimethylammonio)ethyl phosphate, 2-(butenoyloxy)ethyl-2'-(trimethylammonio)ethylphosphate, or combinations thereof.

88. The method or the soft contact lens of any one of inventions 78 to 87, wherein the composition comprises about 50% or less by weight of said one or more reactive vinylic monomers.

89. The method or the soft contact lens of any one of inventions 78 to 87, wherein the composition comprises from about 0.1% to about 30% by weight of said one or more reactive vinylic monomers.

90. The method or the soft contact lens of any one of inventions 78 to 87, wherein the composition comprises from about 0.5% to about 20% by weight of said one or more reactive vinylic monomers.

91. The method or the soft contact lens of any one of inventions 78 to 87, wherein the composition comprises from about 1% to about 15% by weight of said one or more reactive vinylic monomers.

92. The method or the soft contact lens of invention 73 or 75, wherein the second hydrophilicity-enhancing agent is a primary amine-containing polysaccharide, a secondary amine-containing polysaccharide, a carboxyl-containing polysaccharide, hyaluronic acid, chondroitin sulfate, or a combination thereof.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Manually Rubbing Tests.

The lenses are manually rubbed according to product insert with phosphate buffered saline (PBS) (or a multi-purpose lens care solution) for 20 seconds and placed back to the lens case containing a fresh PBS. The above procedure is repeated for a given times, e.g., from 1 to 30 times, (i.e., number of repetitions of manually rubbing tests which imitate cleaning and soaking cycles). As used in this application, the term "i cycles of manual rubbing" (e.g., 7 cycles of manual rubbing) means i times (e.g., 7 times) of repetitions of manual rubbing tests described above for imitating cleaning and soaking cycles.

Lubricity Evaluation.

The lubricity of a lens is evaluated by using a finger-felt lubricity test which characterizes qualitatively the slipperiness of a lens surface on a friction rating scale of from 0 to 4. The higher the friction rating is, the lower the slipperiness (or lubricity).

Commercial lenses: DAILIES® TOTAL1®; ACUVUE® OASYS™; ACUVUE® ADVANCE PLUS™; DAILIES® Aqua Comfort Plus®; and AIR OPTIX®, are assigned a friction rating (designated "FR" hereinafter) of 0, 1, 2, 3, and 4 respectively. They are used as standard lenses for determining the friction rating of a lens under test.

The samples are placed in PBS for at least two rinses of 30 minutes each and then transferred to fresh PBS before the evaluation. Before the evaluation, hands are rinsed with a soap solution, extensively rinsed with DI water and then dried with KimWipe® towels. The samples are handled between the fingers and a numerical number is assigned for each sample relative to the above standard lenses described above. For example, if lenses are determined to be only slightly better than AIR OPTIX® lenses, then they are assigned a number 3. The value of a friction rating is one obtained by averaging the results of at least two friction ratings of a contact lens by two or more persons and/or by averaging the friction ratings of two or more contact lenses (from the identical batch of lens production) by one person.

Surface Wettability Tests.

Water contact angle (WCA) on a contact lens is a general measure of the surface wettability of a contact lens. In particular, a low water contact angle corresponds to more wettable surface. Average contact angles (Sessile Drop) of contact lenses are measured using a VCA 2500 XE contact angle measurement device from AST, Inc., located in Boston, Mass. This equipment is capable of measuring advancing contact angles ($\theta_a$) or receding contact angles ($\theta_r$) or sessile (static) contact angles. Unless specified, water contact angle is sessile (static) contact angle. The measurements are performed on fully hydrated contact lenses and immediately after blot-drying as follows. A contact lens is removed from the vial and washed 3 times in ~200 ml of fresh DI water in order to remove loosely bound packaging additives from the lens surface. The lens is then placed on top of a lint-free clean cloth (Alpha Wpe TX1009), dabbed well to remove surface water, mounted on the contact angle measurement pedestal, blown dry with a blast of dry air and finally the sessile drop contact angle is automatically measured using the software provided by the manufacturer. The DI water used for measuring the contact angle has a resistivity >18MΩcm and the droplet volume used is 2 μl. Typically, uncoated silicone hydrogel lenses (after autoclave) have a sessile drop contact angle around 120 degrees. The tweezers and the pedestal are washed well with Isopropanol and rinsed with DI water before coming in contact with the contact lenses.

Example 2

PAA-Coating Solution.

A polyacrylic acid (PAA) solution is prepared by dissolving Carpobol 907 powder in water to have a concentration of about 0.5% by weight of PAA and then adding formic acid for adjusting pH. This PAA solution is then diluted to a final PAA dip solution of 0.1% wt % PAA and 0.75% formic acid.

IPC Saline.

Poly(AAm-co-AA)(90/10) partial sodium salt (~90% solid content, poly(AAm-co-AA) 90/10, Mw 200,000) is purchased from Polysciences, Inc. and used as received. PAE (Kymene, an azetidinium content of 0.46 assayed with NMR) is purchased from Ashland as an aqueous solution and used as received. An IPC saline is prepared by dissolving about 0.07% w/w of poly(AAm-co-AA)(90/10) and about 0.15% of PAE (an initial azetidinium millimolar equivalents of about 8.8 millimole) in PBS (about 0.044 w/w % $NaH_2PO_4.H_2O$, about 0.388 w/w/% $Na_2HPO_4.2H_2O$, about 0.79 w/w % NaCl) and adjusting the pH to 7.2-7.4. Then the IPC saline is heat pre-treated for about 4 hours at about 70° C. (heat pretreatment) During this heat pretreatment, poly(AAm-co-AA) and PAE are partially crosslinked to each other (i.e., not consuming all azetidinium groups of PAE) to form a water-soluble and thermally-crosslinkable hydrophilic polymeric material containing azetidinium groups within the branched polymer network in the IPC saline. After the heat pre-treatment, the IPC saline is filtered using a 0.22 micron polyether sulphone [PES] membrane filter and cooled down back to room temperature. 10 ppm hydrogen peroxide is then added to the final IPC saline to prevent bioburden growth and the IPC saline is filtered using a 0.22 micron PES membrane filter.

Hydrogel Coating.

The application of a hydrogel coating onto a DAILIES® AquaComfort Plus® (DACP) contact lens involves one PAA-dip coating process and an IPC coating process and is carried out as follows. The DACP contact lenses from Alcon®, which has a water content of about 69% by weight and an elastic modulus of about 0.98 MPa, are soaked in deionized water (DI water) for overnight or longer before the coating; and then are soaked in PAA dip solution (prepared above) at room temperature for 2 minutes, 5 minutes or 10 minutes, while gently being shaken at 60 rpm. The PAA-coated DACP lenses are then rinsed in water for 2 minutes, and placed in polypropylene lens packaging shells (one lens per shell) with 0.6 mL of the IPC saline (half of the saline is added prior to inserting the lens). The blisters are then sealed with foil and autoclaved for about 45 minutes at about 121° C., forming hydrogel-coated DACP contact lenses (i.e., DACP lenses with crosslinked coatings (PAA-x-hydrophilic polymeric material) thereon).

The controlled DACP lenses, which do not undergo through PAA dip and IPC coating processes, are packaged in PBS and autoclaved for 45 minutes at 121° C.

The lens properties, such as, elastic modulus, water content, and elongation at break, are not altered by the surface treatment process for forming a hydrogel coating.

The finger lubricities (i.e., friction ratings) and water contact angles of control DACP contact lenses and hydrogel-coated DACP lenses are determined twice: once directly out-of-pack (so-called "OOP lubricity" or "OOP friction rating") but after ≥30 min soaking in PBS) and the other after 7 cycles of manual rubbing (so-called "A7CMR lubricity" or "A7CMR friction rating") according to the procedures described in Example 1. The results are reported in Table 1.

TABLE 1

|  | Control DACP | Hydrogel-Coated DACP | | |
|---|---|---|---|---|
| PAA-Dipping Time (minutes) | N/A | 2 min | 5 min | 10 min |
| Friction Rating (OOP) | 3 | 0-1 | 0 | 0 |
| Friction Rating (A7CMR) | Not tested | 1 | 0.5 | 0.5 |
| Contact angle (OOP) | 37 | 28 | 24 | 20 |
| Contact angle (A7CMR) | Not tested | 32 | 30 | Not tested |

The results show that all hydrogel coated lenses have better lubricity (a friction rating of 0 or 0~1) as compared to control (a fraction rating of 3) without any manual rubbing and that after 7 cycles of manual rubbing, the lubricity decreases slightly, but still more lubricous as compared to control (out-of-package DACP lenses).

Example 3

PAA-Coating Solution.

A polyacrylic acid (PAA) solution is prepared by dissolving Carpobol 907 powder in water to have a desired concentration and then adding formic acid for adjusting pH. Two PAA solutions are prepared: one solution with 0.1% (by weight) PAA and 0.1% (by weight) $H_2SO_4$, and the other solution with 0.1% by (weight) PAA and 0.74% (by weight) formic acid.

IPC Saline.

The IPC saline is prepared according to the procedures described in Example 2.

Hydrogel Coating.

The application of a hydrogel coating onto a DACP contact lens involves one PAA-dip coating process and an IPC coating process and is carried out according to the procedures described in Example 2, excepting that the PAA-dipping time is 5 minutes.

The controlled DACP lenses, which do not undergo through PAA dip and IPC coating processes, are packaged in PBS and autoclaved for 45 minutes at 121° C.

The out-of-pack finger lubricities (i.e., friction ratings) of control DACP contact lenses and hydrogel-coated DACP lenses are determined directly out-of-pack (OOP) but after 30 min soaking in PBS. It is found that all hydrogel-coated DACP contact lenses from both PAA dip solutions have better lubricity (a friction rating of 0) as compared to control (a friction rating of 3).

Example 4

PAA-Coating Solution.

A polyacrylic acid (PAA) solution is prepared by dissolving Carpobol 907 powder in water to have a concentration of about 0.02% by weight of PAA.

IPC Saline.

The IPC saline is prepared according to the procedures described in Example 2.

Hydrogel Coating.

The application of a hydrogel coating onto a DACP contact lens involves one PAA-dip coating process and an IPC coating process and is carried out according to the procedures described in Example 2, excepting that the PAA-dipping time is either 2 minutes or 4 minutes.

All hydrogel-coated DACP contact lenses have an OOP finger lubricity better lubricity (a friction rating of 0) as compared to control (a friction rating of 3). After one additional autoclave, the OOP finger lubricity decreases slightly as shown by a friction rating of 0.5 (increasing from a friction rating of zero). The OOP finger lubricity decreases as shown by a friction rating of 1 after 15 cycles of manual rubbing and a friction rating of 3 after 30 cycles of manual rubbing.

Example 5

PAA-Coating Solution.

A polyacrylic acid (PAA) solution is prepared by dissolving Carpobol 907 powder in water to have a concentration of about 0.04% by weight of PAA.

IPC Saline.

The IPC saline is prepared according to the procedures described in Example 2.

Hydrogel Coating.

The application of a hydrogel coating onto a DACP contact lens involves one PAA-dip coating process and an IPC coating process and is carried out according to the procedures described in Example 2, excepting that the PAA-dipping time is 2, 4 or 8 minutes.

All hydrogel-coated DACP contact lenses have an OOP finger lubricity better lubricity (a friction rating 0) as compared to control (a friction rating of 3). Even after one additional autoclave (i.e., a total of two autoclaves, the OOP finger lubricity remains unchanged. The finger lubricity decreases as shown by a friction rating of 0.5 after 15 cycles of manual rubbing and by a friction rating of 2 (when dipped in PAA solution for 8 minutes) or 3 (when dipped in PAA solution for 2 minutes) after 30 cycles of manual rubbing. A longer PAA-dipping time and/or a higher PAA concentration can improve the durability of the hydrogel coating (i.e., minimizing or eliminating the adverse impact of manual rubbing upon the finger lubricity).

What is claimed is:

1. A soft contact lens, comprising:
   a non-silicone hydrogel lens body, wherein the non-silicone hydrogel lens body is composed of a hydrogel material which is free of silicone and comprises at least 50% by mole of repeating units of at least one hydroxyl-containing vinylic monomer; and
   a hydrogel coating thereon, wherein the hydrogel coating comprises an anchoring layer of a first polymeric material having first reactive functional groups and a hydrogel layer derived from a second polymeric material having second reactive functional groups, wherein the hydrogel layer is covalently attached onto the anchor layer through linkages each formed between one first reactive functional group and one second reactive functional group, wherein the soft contact lens has a surface lubricity better than the lubricity of the non-silicone hydrogel lens body and has a friction rating of about 2 or lower after 7 cycles of manual rubbing, a water content of from about 10% to about 85% by weight and an elastic modulus of from about 0.2 MPa to about 1.5 MPa when being fully hydrated.

2. The soft contact lens of claim 1, wherein the hydrogel coating has a thickness of from about 0.1 µm to about 20 µm.

3. The soft contact lens of claim 2, wherein the first and second reactive functional groups are different from each other and co-reactive with each other and are selected from the group consisting of carboxyl groups, primary amino groups, secondary amino groups, thiol groups, azetidinium groups, epoxy groups, azlactone groups, aziridine groups, isocyanate groups, vinyl sulfone groups, and combinations thereof.

4. The soft contact lens of claim 3, wherein said at least one hydroxyl-containing vinylic monomer is selected from the group consisting of hydroxyethyl (meth)acrylate, 2-hydroxypropyl (meth)acrylate, 3-hydroxypropyl (meth)acrylate, glycerol (meth)acrylate, N-2-hydroxyethyl (meth)acrylamide, N-2-hydroxypropyl (meth)acrylamide, N-3-hydroxypropyl (meth)acrylamide, N,N-bis(hydroxyethyl) (meth)acrylamide, N-2,3-dihydroxypropyl (meth)acrylamide, N-tris(hydroxymethyl)methyl (meth)acrylamide, vinyl alcohol, allyl alcohol, and combinations thereof.

5. The soft contact lens of claim 3, wherein the hydrogel material is a crosslinked product of a water-soluble, actinically-crosslinkable polyvinyl alcohol prepolymer which comprises:
at least 60% by mole of repeating units of vinyl alcohol;
repeating units of formula (I); and

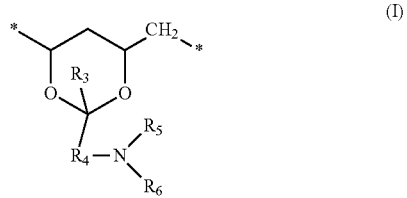

in which:
$R_3$ can be hydrogen or a $C_1$-$C_6$ alkyl group;
$R_4$ is a $C_1$-$C_6$ alkylene divalent radical;
$R_5$ is hydrogen or $C_1$-$C_6$ alkyl;
$R_6$ is an ethylenically unsaturated group of

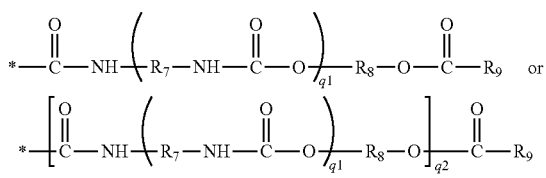

in which q1 and q2 independently of each another are zero or one, and $R_7$ and $R_8$ independently of one another are a $C_2$-$C_8$ alkylene divalent radical, $R_9$ is $C_2$-$C_8$ alkenyl.

6. The soft contact lens of claim 1, wherein the first reactive functional groups are carboxyl groups and the second reactive functional groups are azetidinium groups, wherein the first polymeric material is a polyanionic polymer which is a homo- or co-polymer of at least one carboxyl-containing acrylic monomer selected from the group consisting of acrylic acid, methacrylic acid, ethylacrylic acid, 2-acrylamidoglycolic acid, 2-methacrylamidoglycolic acid, and combinations thereof, wherein the hydrogel layer is covalently attached onto the anchoring layer of the polyanionic polymer through linkages each formed between one carboxyl group and one azetidinium group.

7. The soft contact lens of claim 6, wherein the polyanionic polymer is poly(acrylic acid) (PAA), poly(methacrylic acid) (PMAA), poly(acrylic acid-co-methacrylic acid) (pAA-pMAA), poly(ethylacrylic acid) (PEAA), poly (acrylic acid-co-ethylacrylic acid) (pAA-pEAA), poly (methacrylic acid-co-ethylacrylic acid) (pMAA-pEAA), poly[2-acrylamidoglycolic acid], poly[2-methacrylamidoglycolic acid], or a combination thereof.

8. The soft contact lens of claim 7, wherein the second polymeric material is a water-soluble hydrophilic polymeric material comprising
(i) from about 20% to about 95% by weight of first polymer chains derived from a polyamidoamine-epichlorohydrin or a poly(2-oxazoline-co-ethyleneimine)-epichlorohydrin,
(ii) from about 5% to about 80% by weight of hydrophilic moieties and/or second polymer chains,
wherein each of the hydrophilic moieties is derived from at least one first hydrophilicity-enhancing agent having at least one reactive functional group selected from the group consisting of primary amino group, secondary amino group, carboxyl group, thiol group, and combinations thereof, wherein the hydrophilic moieties are covalently attached to the first polymer chains through one or more covalent linkages each formed between one azetidinium group and one primary or secondary amino, carboxyl or thiol group of the first hydrophilicity-enhancing agent,
wherein each of the second polymer chains is derived from at least one second hydrophilicity-enhancing agent having at least one reactive functional group selected from the group consisting of primary amino group, secondary amino group, carboxyl group, thiol group, and combinations thereof, wherein the second polymer chains are covalently attached to the first polymer chains through one or more covalent linkages each formed between one azetidinium group and one primary amino, secondary amino, carboxyl or thiol group of the second hydrophilicity-enhancing agent, and
(iii) azetidinium groups which are parts of the first polymer chains or pendant or terminal groups covalently attached to the first polymer chains.

9. The soft contact lens of claim 8, wherein the second hydrophilicity-enhancing agent is: a polyethylene glycol having one sole primary or secondary amino, carboxyl or thiol group; a polyethylene glycol with two terminal primary or secondary amino, carboxyl and/or thiol groups; a multi-arm polyethylene glycol with one or more primary or secondary amino, carboxyl and/or thiol groups; a polyethylene glycol dendrimer with one or more primary or secondary amino, carboxyl and/or thiol groups; or a polymerization product of a composition comprising (1) about 60% or less by weight of one or more reactive vinylic monomers and (2) one or more non-reactive hydrophilic vinylic monomers,
wherein said one or more reactive vinylic monomers are vinylic monomers having a carboxyl, primary amino, or secondary amino group, wherein said one or more non-reactive vinylic monomers are selected from the group consisting of a phosphorylcholine-containing vinylic monomer, (meth)acrylamide, N,N-dimethyl (meth)acrylamide, N-vinylpyrrolidone (NVP), N-vinyl formamide, N-vinyl acetamide, N-vinyl isopropylamide, N-vinyl-N-methyl acetamide, N,N-dimethylaminoethyl (meth)acrylate, N,N-dimethylaminopropyl (meth)acrylamide, glycerol (meth)acrylate, N-2-hydroxyethyl (meth)acrylamide, N-2-hydroxypropyl (meth)acrylamide, N-3-hydroxypropyl (meth)acrylamide, N,N-bis(hydroxyethyl) (meth)acrylamide, N-2,3-dihydroxypropyl (meth)acrylamide, N-tris(hydroxymethyl)methyl (meth)acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth)acrylate having a weight average molecular weight of up to 1500 Daltons, allyl alcohol, vinyl alcohol, and combinations thereof.

10. The soft contact lens of claim 1, wherein the first polymeric material comprises epoxy groups, aziridine groups, azlactone groups, isocyanate groups, vinyl sulfone groups, or a combination thereof; and wherein the first polymeric material is grafted to the non-silicone hydrogel lens body to form the anchor layer.

11. The soft contact lens of claim 1, wherein the hydrogel coating has a water-swelling ratio of at least 150%.

12. The soft contact lens of claim 1, wherein said at least one hydroxyl-containing vinylic monomer is selected from the group consisting of hydroxyethyl (meth)acrylate, 2-hydroxypropyl (meth)acrylate, 3-hydroxypropyl (meth)acrylate, glycerol (meth)acrylate, N-2-hydroxyethyl (meth)acrylamide, N-2-hydroxypropyl (meth)acrylamide, N-3-hydroxypropyl (meth)acrylamide, N,N-bis(hydroxyethyl) (meth)acrylamide, N-2,3-dihydroxypropyl (meth)acrylamide, N-tris(hydroxymethyl)methyl (meth)acrylamide, vinyl alcohol, allyl alcohol, and combinations thereof.

13. The soft contact lens of claim 12, wherein the first reactive functional groups are carboxyl groups and the second reactive functional groups are azetidinium groups, wherein the first polymeric material is a polyanionic polymer which is a homo- or co-polymer of at least one carboxyl-containing acrylic monomer selected from the group consisting of acrylic acid, methacrylic acid, ethylacrylic acid, 2-acrylamidoglycolic acid, 2-methacrylamidoglycolic acid, and combinations thereof, wherein the hydrogel layer is covalently attached onto the anchoring layer of the polyanionic polymer through linkages each formed between one carboxyl group and one azetidinium group.

14. The soft contact lens of claim 13, wherein the polyanionic polymer is poly(acrylic acid) (PAA), poly(methacrylic acid) (PMAA), poly(acrylic acid-co-methacrylic acid) (pAA-pMAA), poly(ethylacrylic acid) (PEAA), poly(acrylic acid-co-ethylacrylic acid) (pAA-pEAA), poly(methacrylic acid-co-ethylacrylic acid) (pMAA-pEAA), poly[2-acrylamidoglycolic acid], poly[2-methacrylamidoglycolic acid], or a combination thereof.

15. The soft contact lens of claim 14, wherein the second polymeric material is a water-soluble hydrophilic polymeric material comprising
(i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties and/or second polymer chains,
wherein each of the hydrophilic moieties is derived from at least one first hydrophilicity-enhancing agent having at least one reactive functional group selected from the group consisting of primary amino group, secondary amino group, carboxyl group, thiol group, and combinations thereof, wherein the hydrophilic moieties are covalently attached to the first polymer chains through one or more covalent linkages each formed between one azetidinium group and one primary or secondary amino, carboxyl or thiol group of the first hydrophilicity-enhancing agent,
wherein each of the second polymer chains is derived from at least one second hydrophilicity-enhancing agent having at least one reactive functional group selected from the group consisting of primary amino group, secondary amino group, carboxyl group, thiol group, and combinations thereof, wherein the second polymer chains are covalently attached to the first polymer chains through one or more covalent linkages each formed between one azetidinium group and one primary amino, secondary amino, carboxyl or thiol group of the second hydrophilicity-enhancing agent, and (iii) azetidinium groups which are parts of the first polymer chains or pendant or terminal groups covalently attached to the first polymer chains.

16. The soft contact lens of claim 1, wherein the hydrogel material is a crosslinked product of a water-soluble, actinically-crosslinkable polyvinyl alcohol prepolymer which comprises:
at least 60% by mole of repeating units of vinyl alcohol;
repeating units of formula (I); and

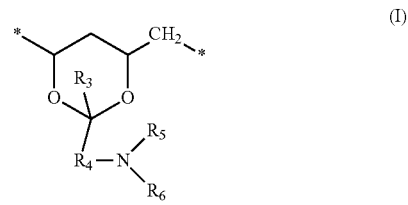

in which:
$R_3$ can be hydrogen or a $C_1$-$C_6$ alkyl group;
$R_4$ is a $C_1$-$C_6$ alkylene divalent radical;
$R_5$ is hydrogen or $C_1$-$C_6$ alkyl;
$R_6$ is an ethylenically unsaturated group of

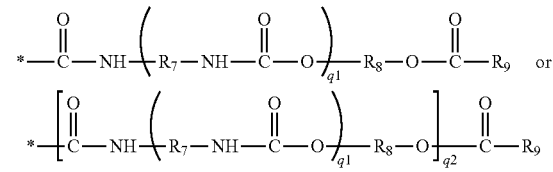

in which q1 and q2 independently of each another are zero or one, and $R_7$ and $R_8$ independently of one another are a $C_2$-$C_8$ alkylene divalent radical, $R_9$ is $C_2$-$C_8$ alkenyl.

17. The soft contact lens of claim 16, wherein the first reactive functional groups are carboxyl groups and the second reactive functional groups are azetidinium groups, wherein the first polymeric material is a polyanionic polymer which is a homo- or co-polymer of at least one carboxyl-containing acrylic monomer selected from the group consisting of acrylic acid, methacrylic acid, ethylacrylic acid, 2-acrylamidoglycolic acid, 2-methacrylamidoglycolic acid, and combinations thereof, wherein the hydrogel layer is covalently attached onto the anchoring layer of the polyanionic polymer through linkages each formed between one carboxyl group and one azetidinium group.

18. The soft contact lens of claim 17, wherein the polyanionic polymer is poly(acrylic acid) (PAA), poly(methacrylic acid) (PMAA), poly(acrylic acid-co-methacrylic acid) (pAA-pMAA), poly(ethylacrylic acid) (PEAA), poly(acrylic acid-co-ethylacrylic acid) (pAA-pEAA), poly(methacrylic acid-co-ethylacrylic acid) (pMAA-pEAA), poly[2-acrylamidoglycolic acid], poly[2-methacrylamidoglycolic acid], or a combination thereof.

19. The soft contact lens of claim 18, wherein the second polymeric material is a water-soluble hydrophilic polymeric material comprising
  (i) from about 20% to about 95% by weight of first polymer chains derived from a polyamidoamine-epichlorohydrin or a poly(2-oxazoline-co-ethyleneimine)-epichlorohydrin,
  (ii) from about 5% to about 80% by weight of hydrophilic moieties and/or second polymer chains,
    wherein each of the hydrophilic moieties is derived from at least one first hydrophilicity-enhancing agent having at least one reactive functional group selected from the group consisting of primary amino group, secondary amino group, carboxyl group, thiol group, and combinations thereof, wherein the hydrophilic moieties are covalently attached to the first polymer chains through one or more covalent linkages each formed between one azetidinium group and one primary or secondary amino, carboxyl or thiol group of the first hydrophilicity-enhancing agent,
    wherein each of the second polymer chains is derived from at least one second hydrophilicity-enhancing agent having at least one reactive functional group selected from the group consisting of primary amino group, secondary amino group, carboxyl group, thiol group, and combinations thereof, wherein the second polymer chains are covalently attached to the first polymer chains through one or more covalent linkages each formed between one azetidinium group and one primary amino, secondary amino, carboxyl or thiol group of the second hydrophilicity-enhancing agent, and
  (iii) azetidinium groups which are parts of the first polymer chains or pendant or terminal groups covalently attached to the first polymer chains.

20. The soft contact lens of claim 19, wherein the second hydrophilicity-enhancing agent is: a polyethylene glycol having one sole primary or secondary amino, carboxyl or thiol group; a polyethylene glycol with two terminal primary or secondary amino, carboxyl and/or thiol groups; a multi-arm polyethylene glycol with one or more primary or secondary amino, carboxyl and/or thiol groups; a polyethylene glycol dendrimer with one or more primary or secondary amino, carboxyl and/or thiol groups; or a polymerization product of a composition comprising (1) about 60% or less by weight of one or more reactive vinylic monomers and (2) one or more non-reactive hydrophilic vinylic monomers,
  wherein said one or more reactive vinylic monomers are vinylic monomers having a carboxyl, primary amino, or secondary amino group,
  wherein said one or more non-reactive vinylic monomers are selected from the group consisting of a phosphorylcholine-containing vinylic monomer, (meth)acrylamide, N,N-dimethyl (meth)acrylamide, N-vinylpyrrolidone (NVP), N-vinyl formamide, N-vinyl acetamide, N-vinyl isopropylamide, N-vinyl-N-methyl acetamide, N,N-dimethylaminoethyl (meth)acrylate, N,N-dimethylaminopropyl (meth)acrylamide, glycerol (meth)acrylate, N-2-hydroxyethyl (meth)acrylamide, N-2-hydroxypropyl (meth)acrylamide, N-3-hydroxypropyl (meth)acrylamide, N,N-bis(hydroxyethyl) (meth)acrylamide, N-2,3-dihydroxypropyl (meth)acrylamide, N-tris(hydroxymethyl)methyl (meth)acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth)acrylate having a weight average molecular weight of up to 1500 Daltons, allyl alcohol, vinyl alcohol, and combinations thereof.

* * * * *